(12) United States Patent
Hollar et al.

(10) Patent No.: US 10,337,442 B2
(45) Date of Patent: Jul. 2, 2019

(54) METHODS AND SYSTEM FOR IMPROVING ACCURACY OF INJECTING SMALLER AMOUNTS OF FUEL TO AN ENGINE

(71) Applicant: Ford Global Technologies, LLC, Dearborn, MI (US)

(72) Inventors: Paul Hollar, Belleville, MI (US); Ethan D. Sanborn, Saline, MI (US); Daniel Dusa, West Bloomfield, MI (US); Xiaoying Zhang, Dearborn Heights, MI (US); Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/131,950

(22) Filed: Apr. 18, 2016

(65) Prior Publication Data

US 2016/0363087 A1 Dec. 15, 2016

Related U.S. Application Data

(60) Provisional application No. 62/174,108, filed on Jun. 11, 2015.

(51) Int. Cl.
*F02D 41/30* (2006.01)
*F02B 5/02* (2006.01)
(Continued)

(52) U.S. Cl.
CPC ............ *F02D 41/3076* (2013.01); *F02B 5/02* (2013.01); *F02D 41/0007* (2013.01); *F02D 41/008* (2013.01); *F02D 41/1456* (2013.01); *F02D 41/182* (2013.01); *F02D 41/221* (2013.01); *F02D 41/26* (2013.01); (Continued)

(58) Field of Classification Search
CPC .. F02D 41/3076; F02D 41/008; F02D 41/221; F02D 41/0007; F02D 41/1456; F02D 41/3094; F02D 41/182; F02D 41/26; F02D 2200/0402; F02D 2200/0406; F02D 2250/12; F02B 5/02; Y02T 10/144
See application file for complete search history.

(56) References Cited

U.S. PATENT DOCUMENTS 7,143,740 B2 * 12/2006 Shirakawa ............ F02D 41/403
 123/299
7,770,560 B2 * 8/2010 Ulrey ...................... F02D 41/20
 123/431

(Continued)

OTHER PUBLICATIONS

Hollar, Paul et al., "Methods and System for Transitioning Between Fuel Injection Windows," U.S. Appl. No. 15/131,774, filed Apr. 18, 2016, 76 pages.

(Continued)

*Primary Examiner* — David Hamaoui
(74) *Attorney, Agent, or Firm* — Julia Voutyras; McCoy Russell LLP

(57) ABSTRACT

Methods and systems for simultaneously operating port fuel injectors and direct fuel injectors of an internal combustion engine are described. In one example, a port fuel injection window is shorted to provide time for scheduling a direct fuel injector pulse width so that the direct fuel injector pulse width may be adjusted so that a desired amount of fuel enters a cylinder.

7 Claims, 15 Drawing Sheets

(51) Int. Cl.
*F02D 41/26* (2006.01)
*F02D 41/14* (2006.01)
*F02D 41/18* (2006.01)
*F02D 41/00* (2006.01)
*F02D 41/22* (2006.01)

(52) U.S. Cl.
CPC .. *F02D 41/3094* (2013.01); *F02D 2200/0402* (2013.01); *F02D 2200/0406* (2013.01); *F02D 2250/12* (2013.01); *Y02T 10/144* (2013.01)

(56) References Cited

U.S. PATENT DOCUMENTS

| | | | | |
|---|---|---|---|---|
| 7,813,866 | B2* | 10/2010 | Demura | F02D 41/064 |
| | | | | 123/491 |
| 9,255,541 | B2* | 2/2016 | Surnilla | F02D 41/3094 |
| 9,303,577 | B2* | 4/2016 | Surnilla | F02D 41/062 |
| 9,435,287 | B2* | 9/2016 | Surnilla | F02D 41/008 |
| 9,631,572 | B2* | 4/2017 | Glugla | F02D 35/028 |
| 9,909,523 | B1* | 3/2018 | Glugla | F02D 41/401 |
| 2006/0016431 | A1* | 1/2006 | Mashiki | F02D 35/027 |
| | | | | 123/431 |
| 2016/0363066 | A1* | 12/2016 | Sanborn | F02D 41/0085 |
| 2016/0363088 | A1* | 12/2016 | Hollar | F02M 69/046 |
| 2016/0363089 | A1* | 12/2016 | Hollar | F02D 41/3094 |
| 2016/0363090 | A1* | 12/2016 | Russ | F02D 41/2432 |
| 2016/0363091 | A1* | 12/2016 | Sanborn | F02D 41/3094 |

OTHER PUBLICATIONS

Hollar, Paul et al., "Methods and System for Improving Fuel Delivery Amount Accuracy," U.S. Appl. No. 15/131,861, filed Apr. 18, 2016, 76 pages.

Russ, Stephen George et al., "Methods and System for Reducing Particulate Matter Produced by an Engine," U.S. Appl. No. 15/132,009, filed Apr. 18, 2016, 75 pages.

Sanborn, Ethan D. et al., "Methods and System Mitigating Direct Injection Degradation," U.S. Appl. No. 15/132,044, filed Apr. 18, 2016, 73 pages.

Sanborn, Ethan D. et al., "Methods and System Mitigating Port Injection Degradation," U.S. Appl. No. 15/132,082, filed Apr. 18, 2016, 75 pages.

* cited by examiner

METHODS AND SYSTEM FOR IMPROVING ACCURACY OF INJECTING SMALLER AMOUNTS OF FUEL TO AN ENGINE

CROSS REFERENCE TO RELATED APPLICATION

The present application claims priority to U.S. Provisional Patent Application No. 62/174,108, entitled "Methods and System for Improving Accuracy of Injecting Smaller Amounts of Fuel to an Engine," filed on Jun. 11, 2015, the entire contents of which are hereby incorporated by reference for all purposes.

FIELD

The present description relates to methods and a system for port and direct injection of fuel to an internal combustion engine. The methods and systems may be particularly useful for improving accuracy of injecting smaller amount of fuel to an engine during an engine cycle.

BACKGROUND/SUMMARY

Fuel may be injected to an internal combustion engine via port fuel injectors and direct fuel injectors. The port fuel injectors may improve fuel atomization during cold conditions and provide a longer duration for injecting fuel to combust during a cylinder cycle. The direct fuel injectors may increase cylinder charge cooling so that the possibility of engine knock may be reduced. Port and direct fuel injectors may be deployed in boosted engines to help extend the engine's dynamic speed and torque range. However, at lower to middle engine loads, it may be more difficult to control the engine's air fuel ratio because small changes in a small amount of fuel desired to be injected to a cylinder may provide larger undesirable changes in engine air-fuel ratio. Further, changes in an estimated amount of air inducted to a cylinder after fuel delivery is scheduled for the cylinder may lead for further engine air-fuel ratio variation from a desired engine air-fuel ratio.

The inventors herein have recognized the above-mentioned disadvantages and has developed an engine fueling method, comprising: port injecting fuel to a cylinder in a cylinder cycle via a first fuel pulse width, the first fuel pulse width adjusted responsive to engine operating conditions after being scheduled for delivery; and directly injecting fuel to the cylinder in the cylinder cycle via a second fuel pulse width, the second fuel pulse width selectively adjusted after being scheduled for delivery.

By adjusting a port fuel injection amount in response to changes in engine operating conditions during a cylinder cycle, it may be possible to provide the technical result of adjusting a port fuel injection amount to meet a changing desired cylinder fuel amount. Further, an amount of directly injected fuel may also be adjusted to meet changes in desired fuel amount, even after intake valve closing, so that a sum of port injected fuel and direct injected fuel amounts more closely matches a desired cylinder fuel amount.

The present description may provide several advantages. In particular, the approach may improve engine air-fuel ratio control. Additionally, the approach may provide an improved way to adjust direct fuel injection pulse widths after port fuel injection pulse widths have been adjusted after being scheduled. Further, the approach provides for a systematic way of operating direct and port fuel injectors.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
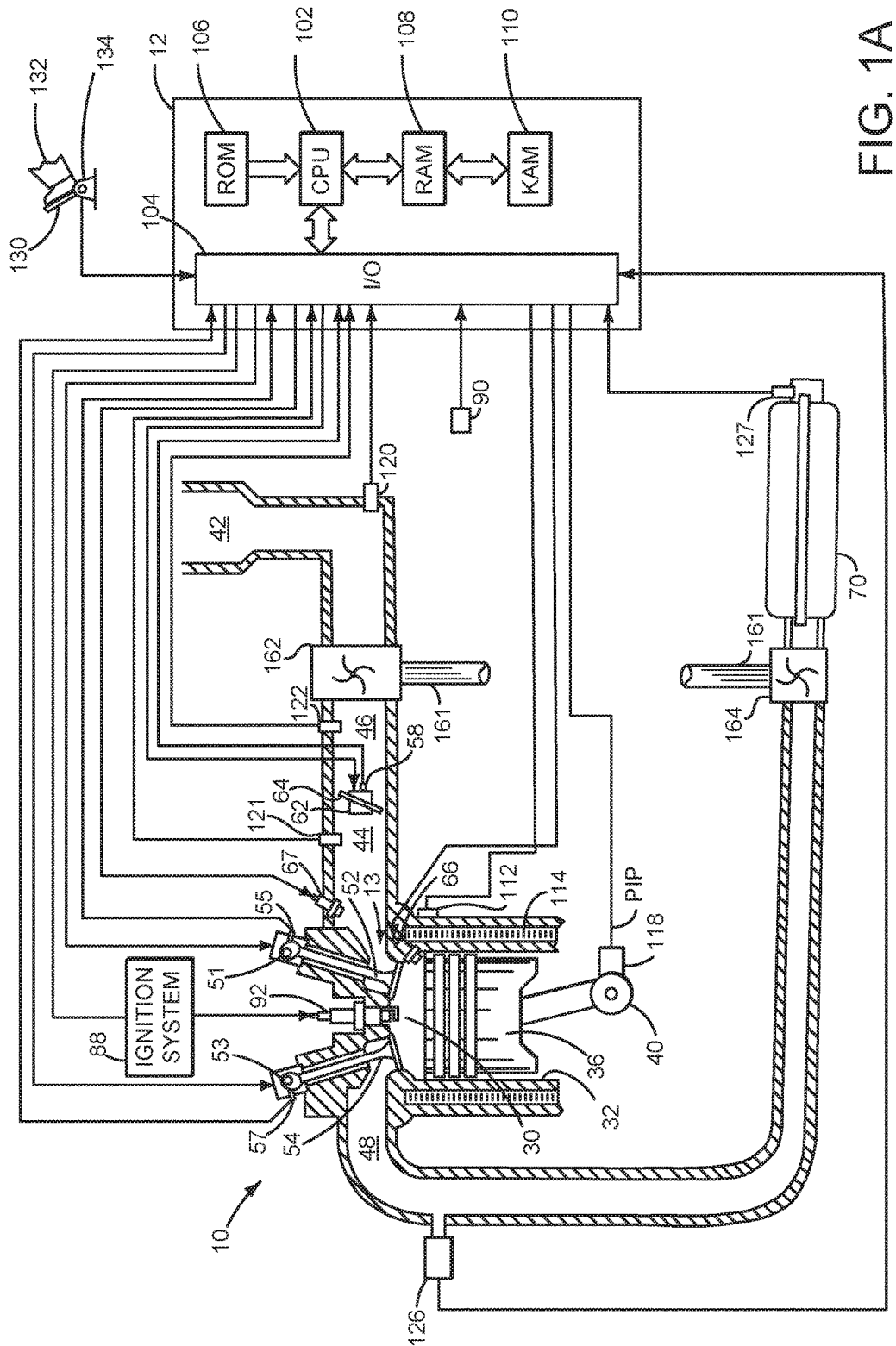
FIG. 1A shows a schematic depiction of an engine.
Figure 1B:
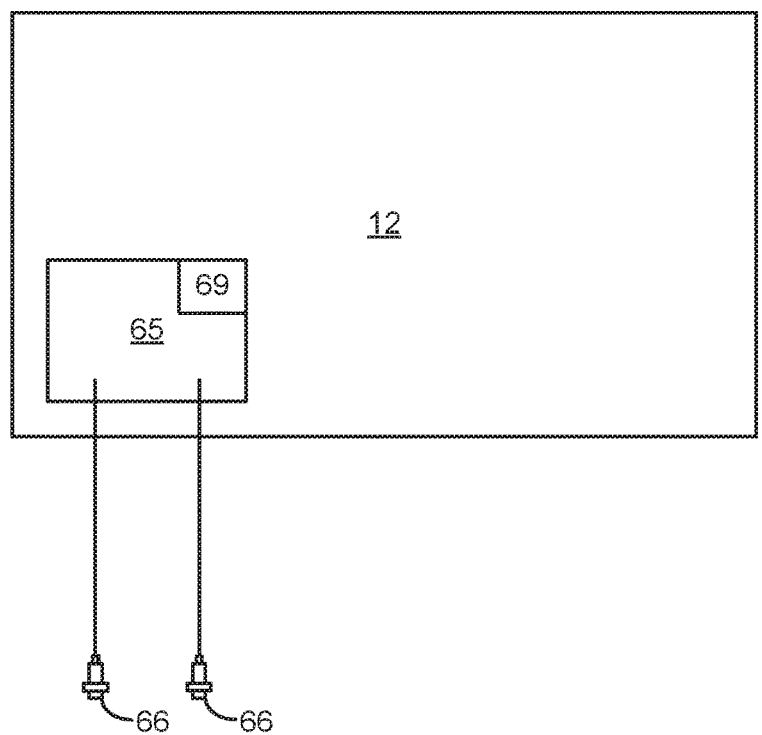
FIG. 1B shows an example of a paired fuel injector driver.
Figure 2:
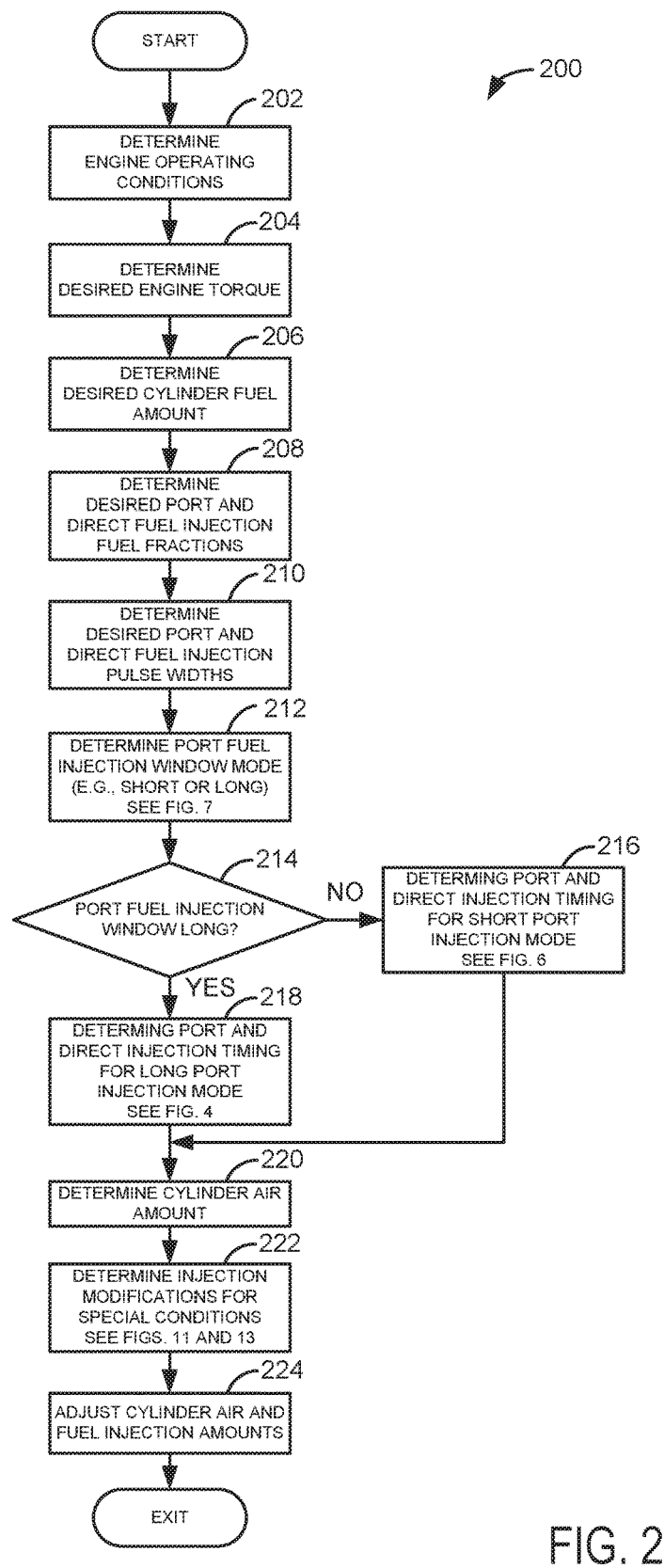
FIG. 2 shows a method for providing air and fuel to an engine that includes two different types of fuel injectors.
Figure 3:
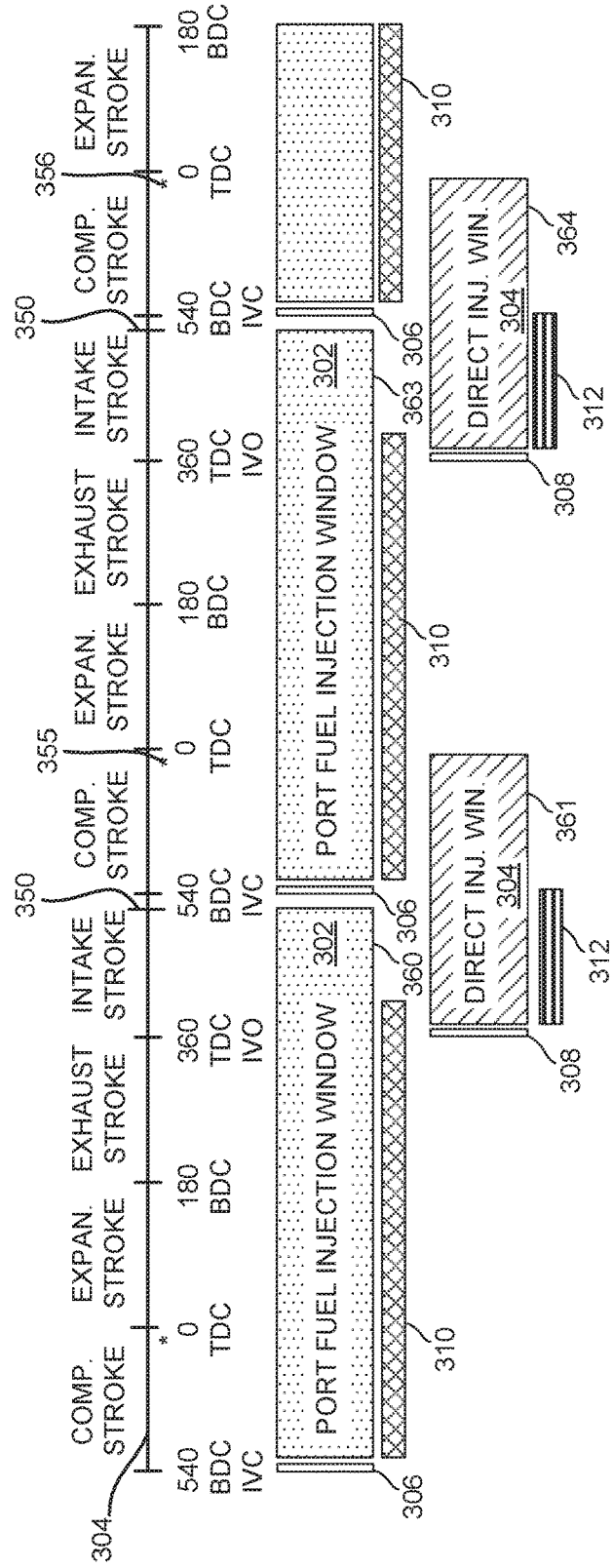
FIG. 3 shows a cylinder timing diagram that includes a longer port fuel injection window duration.
Figure 7:
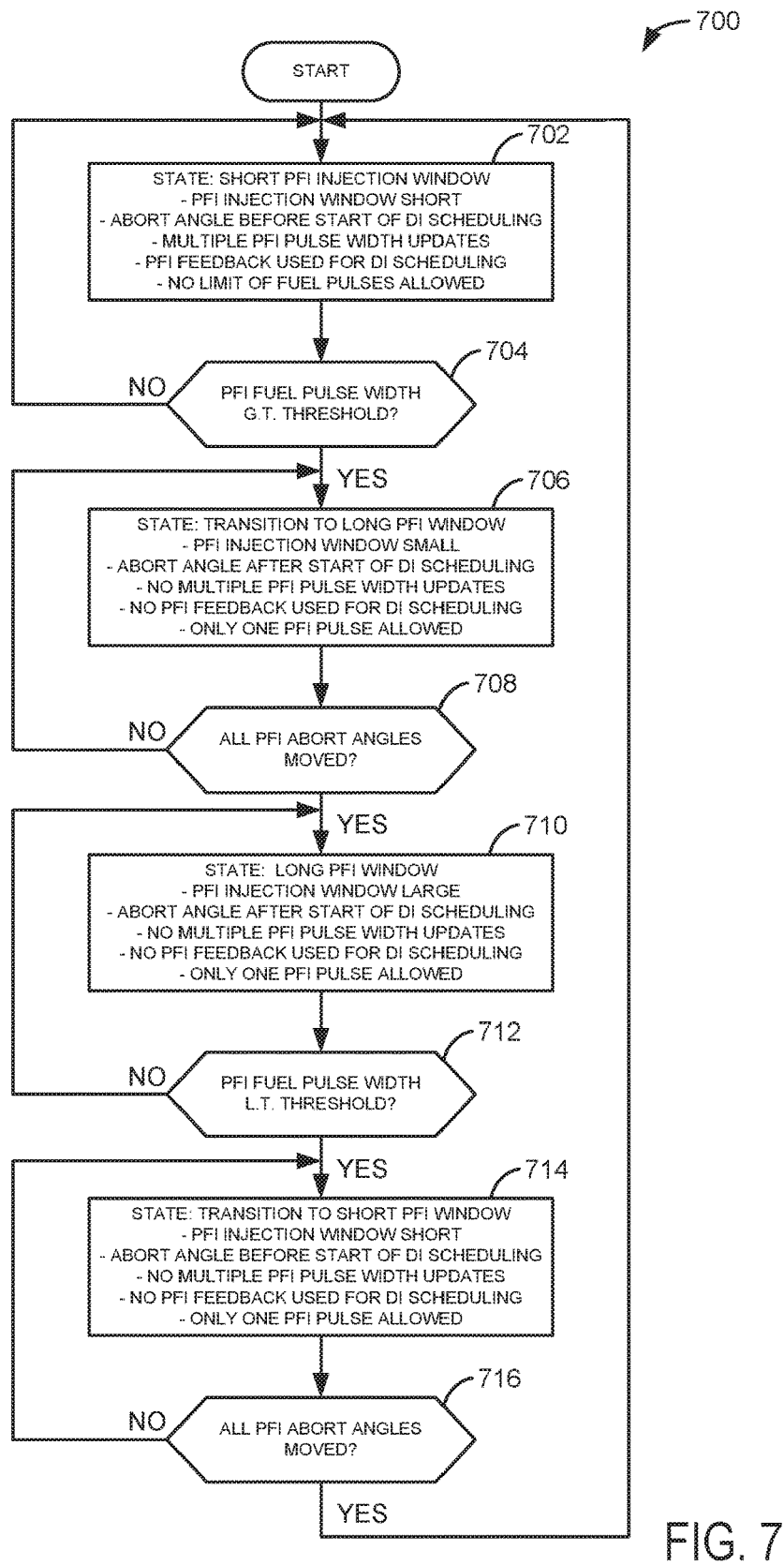
FIG. 7 shows a method for providing different size port fuel injection windows based on port fuel injection pulse width duration and transitioning between the different size port fuel injection windows.
Figure 8:
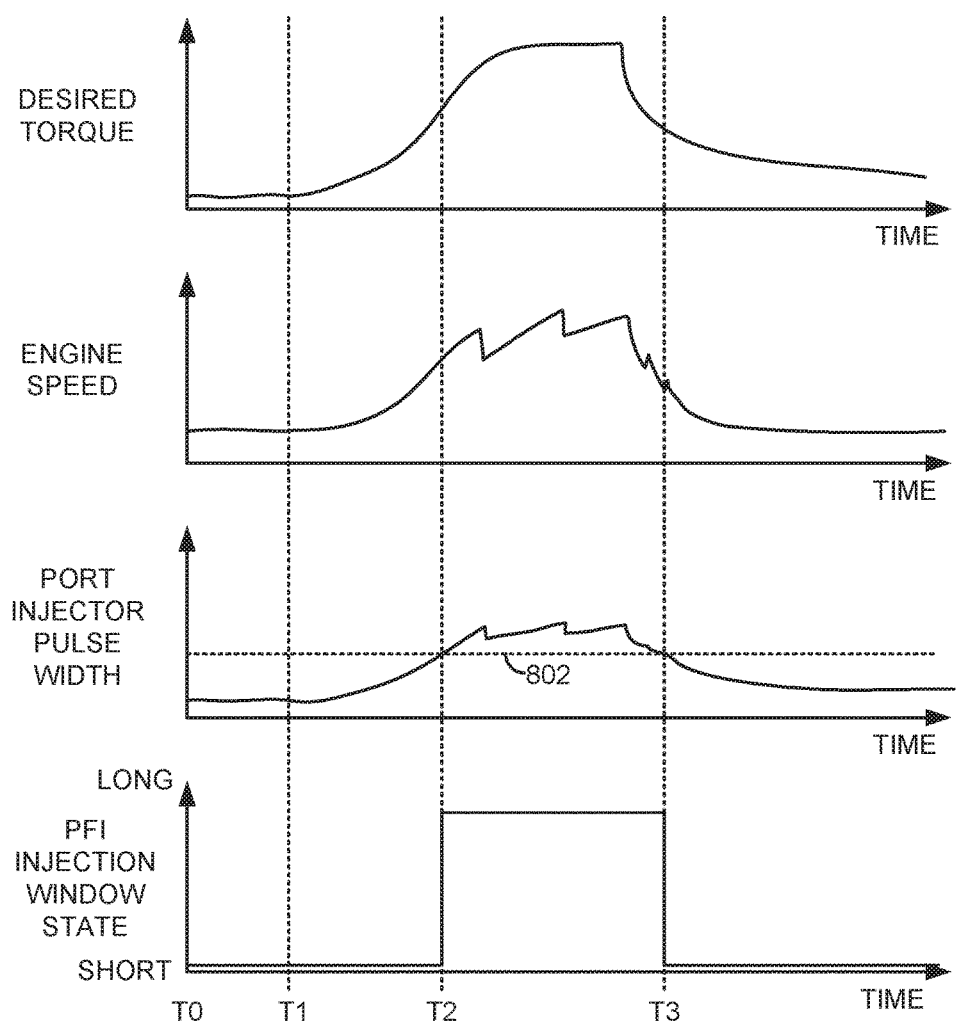
FIG. 8 shows a sequence based on the method of FIG. 7 where a fuel injection system is transitioned between a shorter duration port fuel injection window and a longer duration port fuel injection window.

The present description is directed to supplying fuel to an engine that includes both port and direct fuel injectors. FIG. 1A shows one example of a system that includes port and direct fuel injectors. The system includes a spark ignition engine that may be operated with gasoline, alcohol, or a mixture of gasoline and alcohol. The system of FIG. 1A may include a paired fuel injector driver as is shown in FIG. 1B. FIG. 2 shows a method for supplying fuel to an engine that includes port and direct fuel injectors. FIG. 3 shows an example cylinder cycle timing diagram that includes a longer port fuel injection window. The method of FIG. 4 describes port and direct fuel injection for longer port fuel injection windows. FIG. 5 shows an example cylinder cycle timing diagram that includes a shorter port fuel injection window. The method of FIG. 6 describes port and direct fuel injection for shorter port fuel injection windows. FIG. 7 shows a method for operating an engine with different duration port fuel injection windows and transitioning between shorter and longer duration fuel injection windows. A prophetic sequence for changing between shorter and longer duration port fuel injection windows is shown in FIG. 8.

Figure 9:
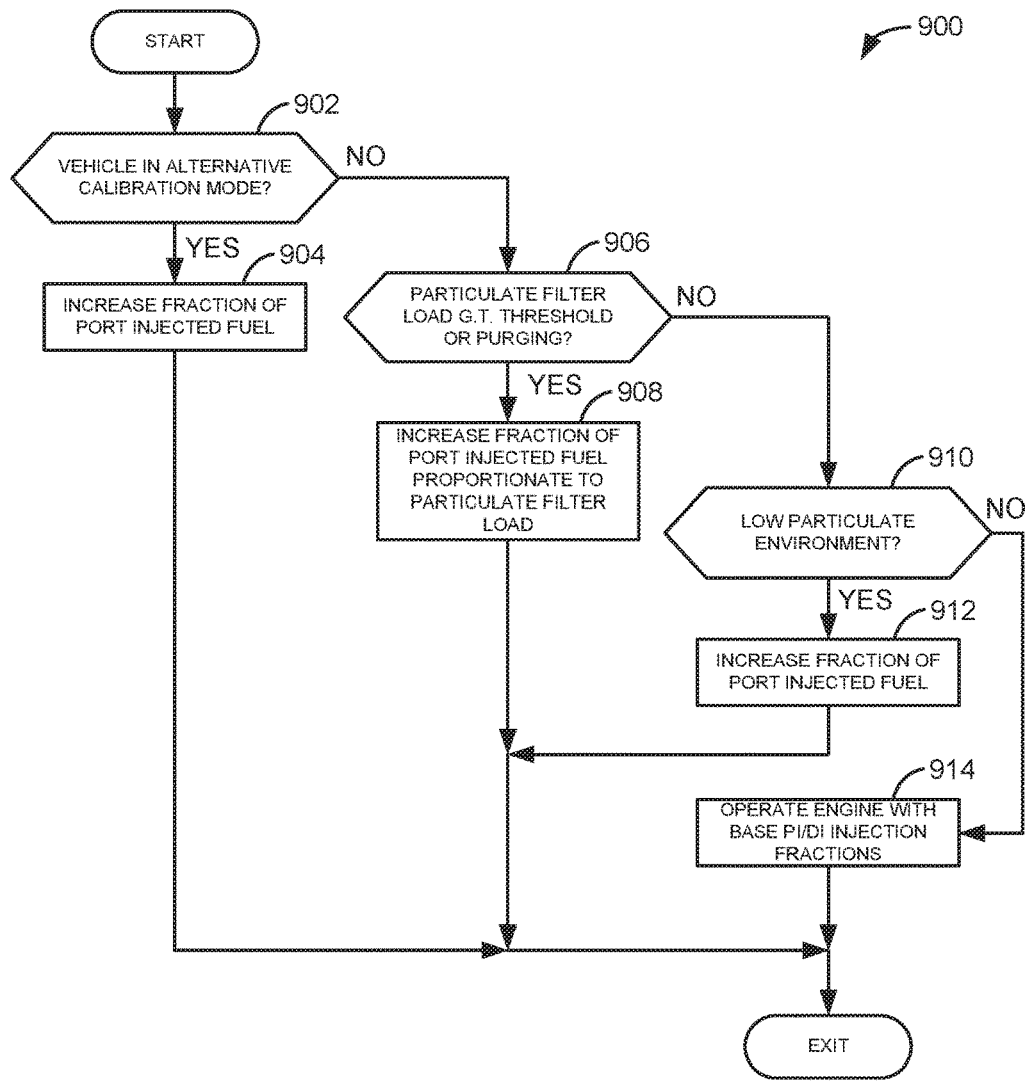
FIG. 9 shows an example method for adjusting fractions of port injected fuel and direct injected fuel to reduce particulate matter production.
Figure 10:
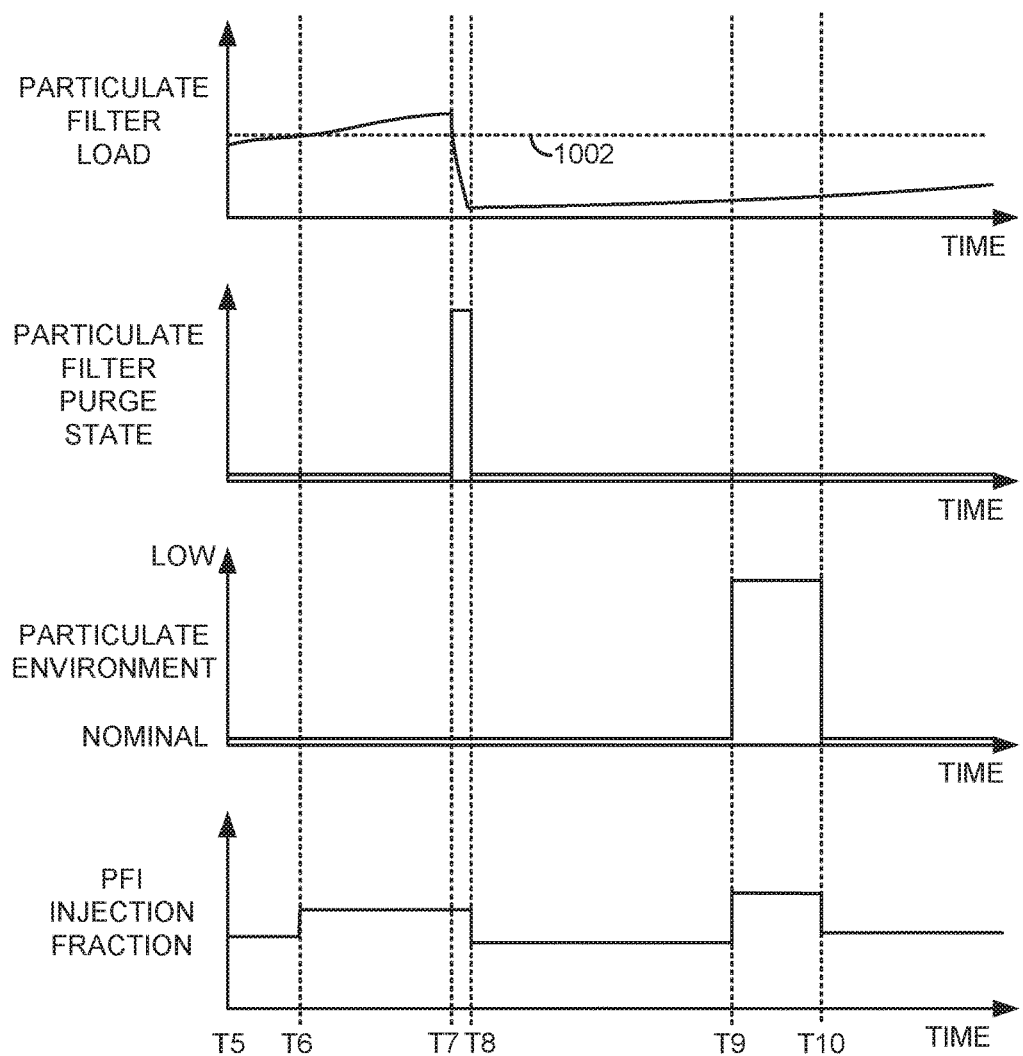
FIG. 10 shows an example operating sequence according to the method of FIG. 9.

The present description also provides for controlling an engine responsive to particulate matter accumulation and formation. In particular, a method for adjusting port and direct fuel fractions responsive to particulate matter accumulation and formation is shown in FIG. 9. A prophetic sequence for adjusting port and direct injection fractions according to particulate matter formation and accumulation is shown in FIG. 10.

Figure 11:
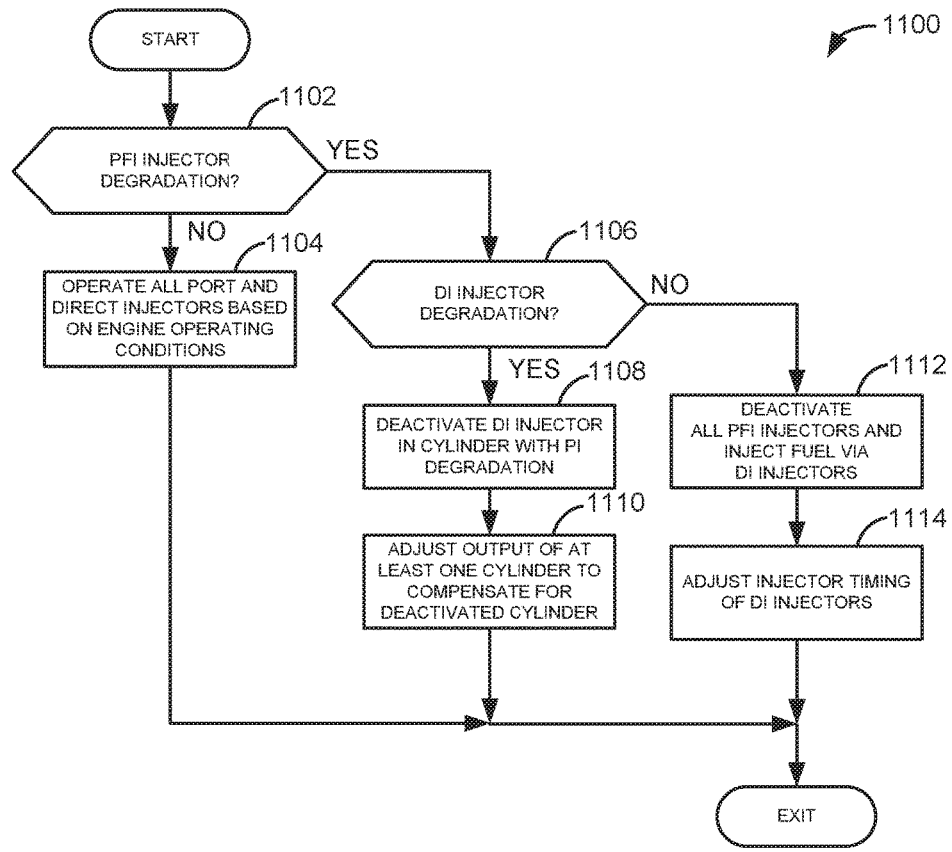
FIG. 11 shows an example method for compensating for port fuel injector degradation.
Figure 12:
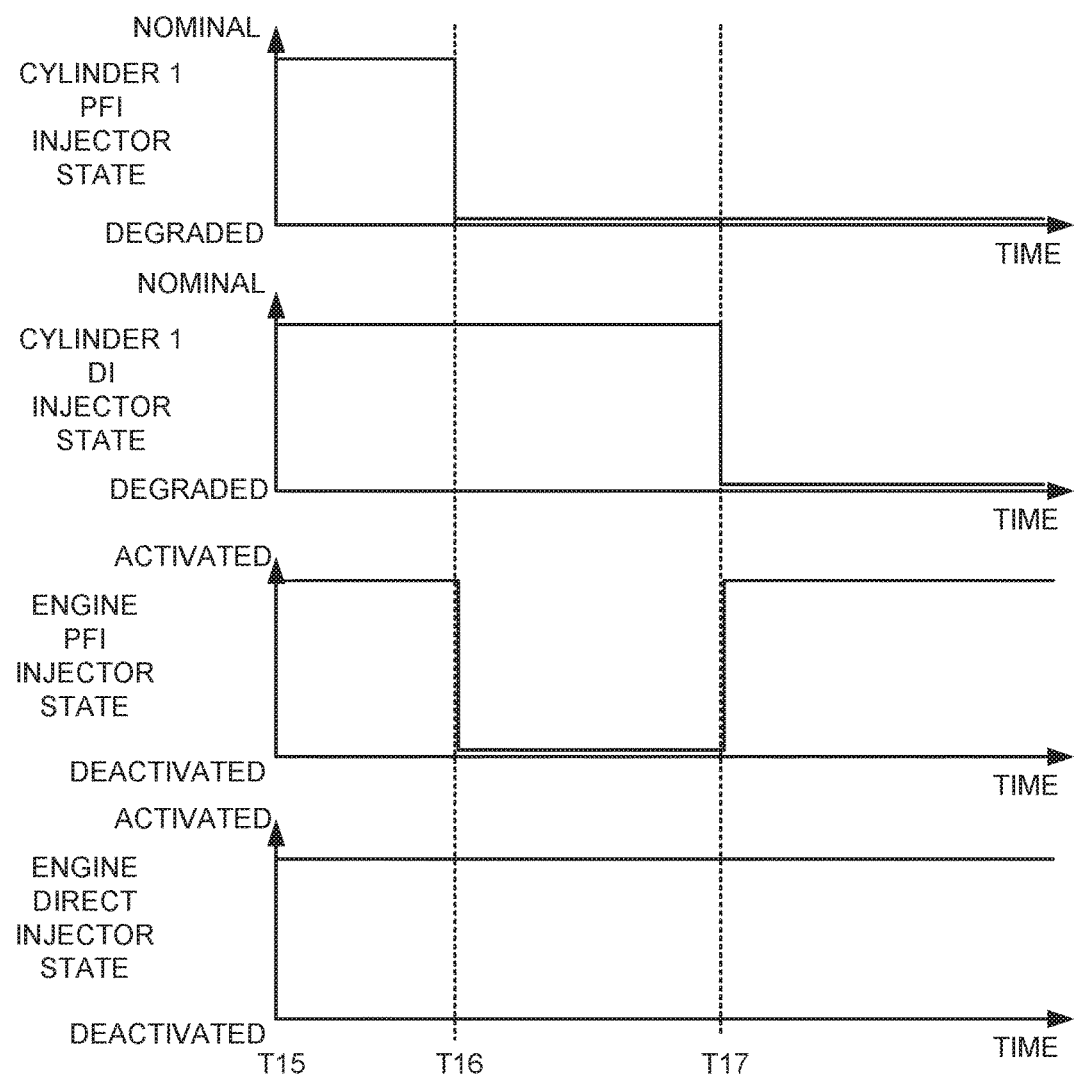
FIG. 12 shows an example operating sequence according to the method of FIG. 11.
Figure 13:
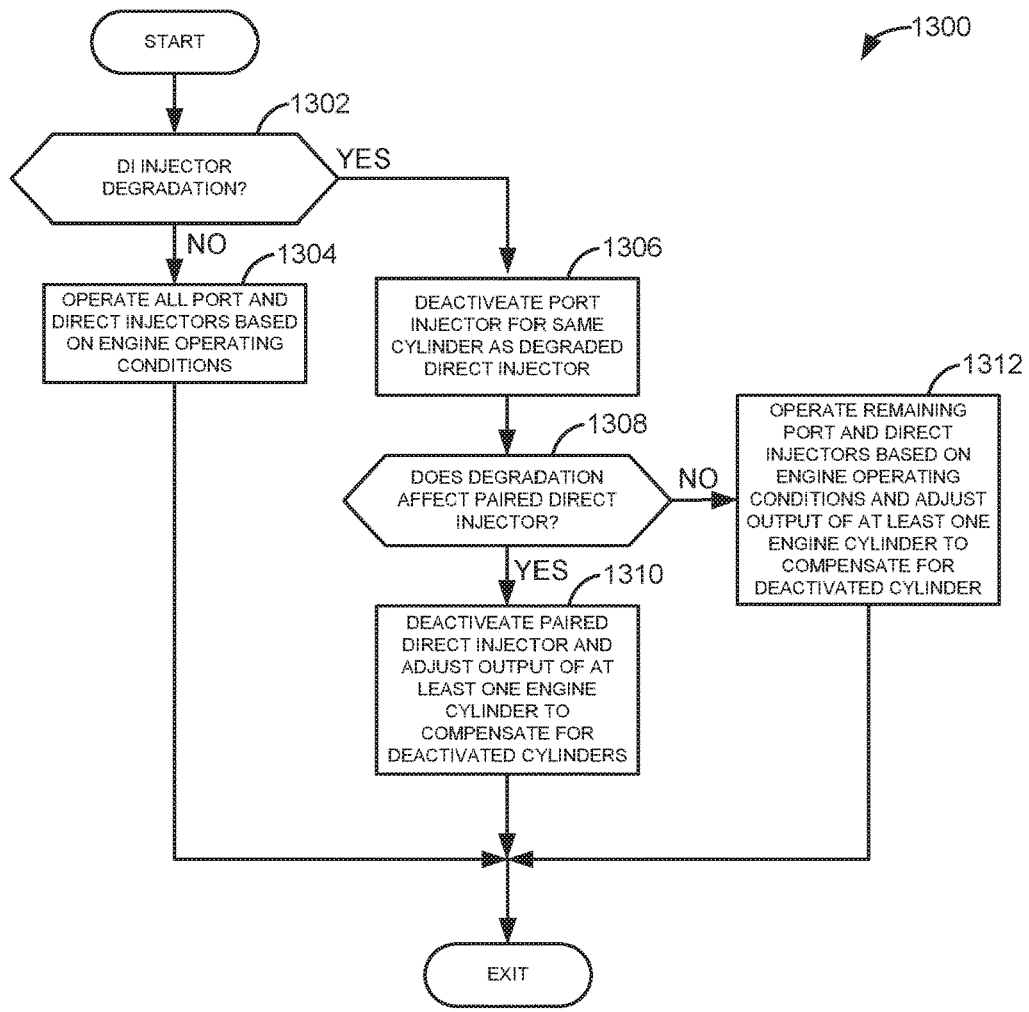
FIG. 13 shows an example method for compensating for direct fuel injector degradation.
Figure 14:
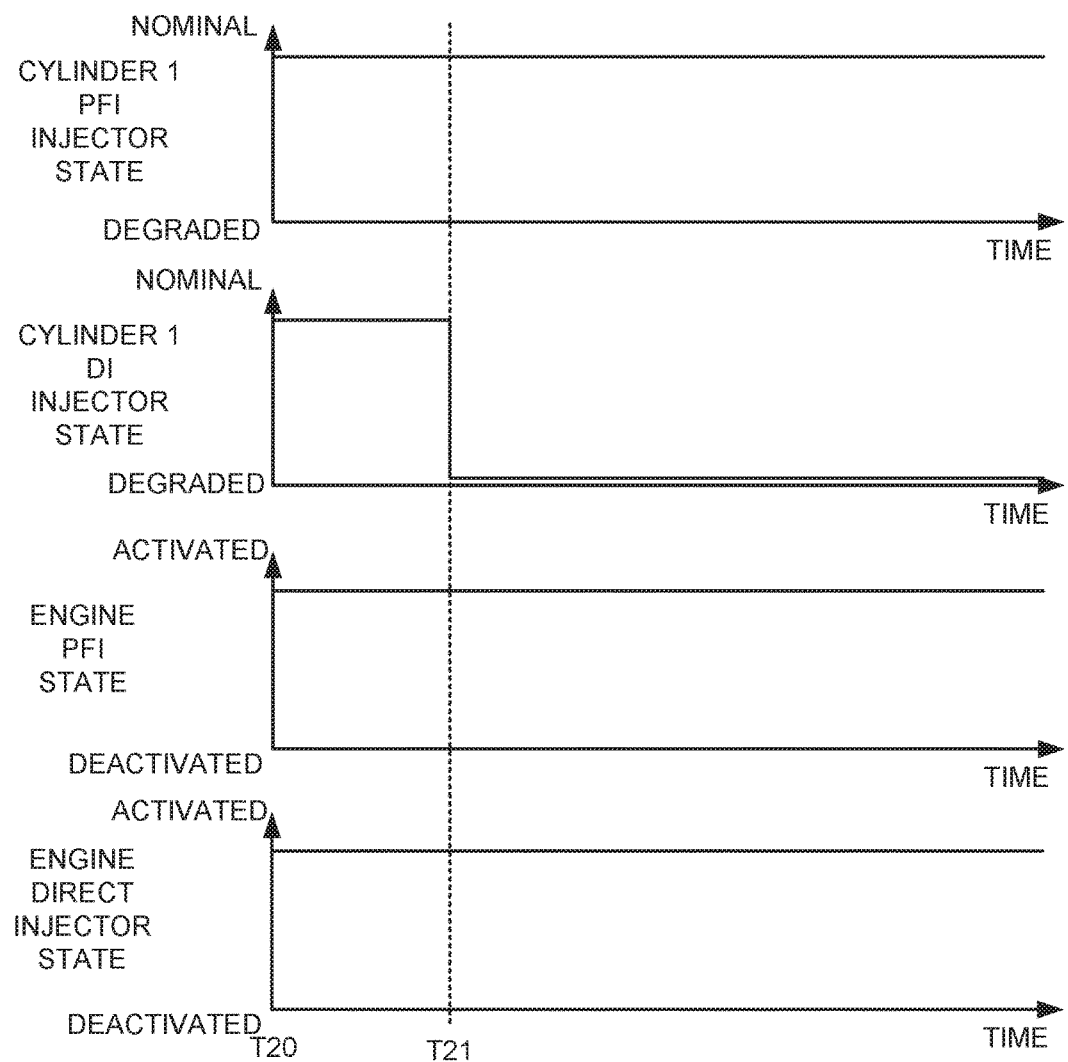
FIG. 14 shows an example operating sequence according to the method of FIG. 13.

The present description also provides for controlling an engine responsive to fuel injector degradation. For example, a method for operating an engine with port fuel injector degradation is shown in FIG. 11. A prophetic engine operating sequence for an engine exhibiting port fuel injector degradation is shown in FIG. 12. A method for operating an engine with direct fuel injector degradation is shown in FIG. 13. A prophetic engine operating sequence for an engine exhibiting direct fuel injector degradation is shown in FIG. 14.

Referring to FIG. 1A, internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct fuel injection or direct injection. Port fuel injector 67 is positioned to inject fuel to cylinder port 13, which is known to those skilled in the art as port fuel injection or port injection. Fuel injectors 66 and 67 deliver liquid fuel in proportion to the pulse width of signals from controller 12. Fuel is delivered to fuel injectors 66 and 67 by a fuel system (not shown) including a fuel tank, fuel pump, and fuel rail (not shown). Fuel injects 66 and 67 may inject a same type of fuel or different types of fuel. In addition, intake manifold 44 is shown communicating with optional electronic throttle 62 which adjusts a position of throttle plate 64 to control air flow from intake boost chamber 46.

Exhaust gases spin turbine 164 which is coupled to compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. The exhaust system also contains a universal oxygen sensor 127 position downstream of after treatment device 70 in a direction of flow through engine 10. In some examples, exhaust gas after treatment device 70 is a particulate filter that includes a three-way catalyst. In other examples, the particulate filter may be separate from the three-way catalyst.

Controller 12 is shown in FIG. 1A as a conventional microcomputer including: microprocessor unit 102, input/output ports 104, read-only or non-transitory memory 106, random access memory 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); vehicle environmental information from sensors 90; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Environmental information may be provided to controller 12 via a global positioning receiver, camera, laser, radar, pressure sensors, or other known sensor via sensors 90. The environmental information may be the basis for adjusting port and direct fuel injection windows and timing as discussed in further detail in the description of FIG. 9.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 1B, an example of a paired fuel injector driver is shown. Paired fuel injector driver 65 selectively supplies current to fuel injectors 66. In one example, paired fuel injector driver 65 may be comprised of metal oxide semiconductor field effect transistors (MOSFET). Paired fuel injector driver may include monitoring circuits 69 for sending diagnostic information to controller 12. Because paired fuel injector driver 65 supplies electric current to two fuel injectors, it may be possible for paired fuel injector driver 65 to degrade, thereby degrading performance of two fuel injectors 66 simultaneously.

The system of FIGS. 1A and 1B provides for a system, comprising: an engine including a port fuel injector and a direct fuel injector providing fuel to a cylinder; and a controller including executable instructions stored in non-transitory memory for providing a plurality of revisions to a pulse width for operating the port fuel injector before a port fuel injection abort angle, the port fuel injection abort angle based on a port fuel injection pulse width less than a threshold, and instructions to adjust a direct fuel injector pulse width supplied to the direct fuel injector in response to an end time of the pulse width supplied to the port fuel injector.

In some examples, the system further comprises adjusting the direct fuel injection pulse width based on a change in cylinder air amount when the port fuel injector pulse width is greater than the threshold. The system further comprises additional instructions to provide a port fuel injection window during a cycle of the cylinder. The system includes where the abort angle corresponds to an engine crankshaft angle. The system further comprises additional instructions to adjust the abort angle in response to the pulse width for operating the port fuel injector. The system includes where the abort angle is retarded in response to the pulse width for operating the port fuel injector being greater than a threshold.

Referring now to FIG. 2, a method for providing air and fuel to an engine that includes two different types of fuel injectors is shown. The method of FIG. 2 may include and/or cooperate with the methods of FIGS. 4, 6, 7, 9, 11, and 13. Further, at least portions of the method of FIG. 2 may be included as executable instructions in the system of FIGS. 1A and 1B. Additionally, portions of the method of FIG. 2 may be actions taken by controller 12 in the physical world to transform vehicle operating conditions. The steps of method 200 are described for a single cylinder receiving fuel during a cylinder cycle. Nevertheless, fuel injections for remaining engine cylinders may be determined in a similar way.

At 202, method 200 determines engine and vehicle operating conditions. Engine and vehicle operating conditions may include but are not limited to vehicle speed, desired torque, accelerator pedal position, engine coolant temperature, engine speed, engine load, engine air flow amount, cylinder air flow amount for each engine cylinder, and ambient temperature and pressure. Method 200 determines operating conditions via querying engine and vehicle sensors. Method 200 proceeds to 204 after operating conditions are determined.

At 204, method 200 determines a desired engine torque. In one example, desired engine torque is based on accelerator pedal position and vehicle speed. The accelerator pedal position and vehicle speed index tables and/or functions that output a desired torque. The tables and/or functions include empirically determined values of desired torque. Accelerator pedal position and vehicle speed provide a basis for indexing the tables and/or functions. In alternative examples, desired engine load may replace desired torque. Method 200 proceeds to 206 after the desired engine torque is determined.

At 206, method 200 determines a desired cylinder fuel amount. In one example, the desired cylinder fuel amount is based on the desired engine torque. In particular, tables and or functions output empirically determined values of desired cylinder fuel amount (e.g., a desired amount of fuel to inject to a cylinder during a cycle of the cylinder (e.g., two engine revolutions)) based on the desired engine torque at the present engine speed. Further, the desired fuel amount may include adjustments for improving catalyst efficiency, reducing exhaust gas temperatures, and vehicle and engine environmental conditions. Method 200 proceeds to 208 after the desired fuel amount is determined.

At 208, method 200 determines desired port fuel injection fraction and desired direct fuel injection fraction. The port fuel injection fraction is a percentage of a total amount of fuel injected to a cylinder during a cylinder cycle that is injected via a port fuel injector. Thus, if the desired fuel amount at 206 is determined to be X grams of fuel and the port injection fraction is 0.6 or 60%, then the port amount of fuel injected is 0.6·X. The port fuel injection fraction plus the direct fuel injection fraction equal a value of one. Thus, the direct fuel injection fraction is 0.4 when the port fuel injection fraction is 0.6.

In one example, the port and direct fuel fractions are empirically determined and stored in a table or function that may be indexed via engine speed and desired torque. The tables and/or functions output the port fuel fraction and the direct fuel fraction.

The amount of air entering a cylinder may also be determined at 208. In one example, the amount of air entering a cylinder is an integrated value of air flowing through an air meter during an intake stroke of the cylinder receiving fuel. Further, the air flow through the air meter may be filtered for manifold filling. In still other examples, the amount of air flowing into a cylinder may be determined via intake manifold pressure, engine speed, and the ideal gas law as is known in the art. Method 200 proceeds to 210 after the port and direct fuel injection fractions are determined.

At 210, method 200 determines the desired port fuel injection pulse width and the desired direct fuel injection pulse width. The desired port fuel injection pulse width is determined by multiplying desired fuel amount determined at 206 by the port fuel fraction determined at 208. A port fuel injector transfer function is then indexed via the resulting fuel amount and the transfer function outputs a fuel injector pulse width. The starting time of the port fuel injector pulse width is at earliest the starting angle of the port fuel injection window. The ending time of the port fuel injector pulse width is a time that provides the desired port fuel injection pulse width after the port fuel injector is opened at the starting time or crankshaft angle of the port fuel injection window, or alternatively, the ending time of the port fuel injector pulse width is the end of the port fuel injection window. The desired port fuel injection pulse width may be revised several times during a cylinder cycle based on updated estimates of air entering the cylinder receiving the fuel only if short port fuel injection windows are enabled. The cylinder air amount may be based on output of a MAP sensor or a mass air flow sensors as is known in the art. Thus, the port fuel injection fuel amount may start out as a larger value and then decrease as the engine rotates through the cylinder cycle. Conversely, the port fuel injection fuel amount may start out as a smaller value and then increase as the engine rotates through the cylinder cycle.

The desired direct fuel injection pulse width is determined by multiplying desired fuel amount determined at 206 by the direct fuel fraction determined at 208. Further, the direct fuel injector pulse width may also revised based on the amount of port injected fuel in the cylinder cycle. In particular, if the port fuel injection window is a short duration window, port fuel injector feedback information is provided to method 600 for determining an amount of fuel to directly inject to the engine as is described in the method of FIG. 6. If the port fuel injection window is a long duration, the amount of port fuel injected is based on the scheduled amount of port fuel to inject. Because no port fuel injection updates are allowed when the port fuel injection window is a long duration, the amount of port fuel injected is known at the time the port fuel amount is initially scheduled at intake valve closing as described in the method of FIG. 4. Method 200 proceeds to 212 after the desired port and direct fuel injection pulse widths are determined.

At 212, method 200 determines if the port fuel injection window is short or long. If the port fuel injection pulse width determined at 210 is greater than a threshold, the port fuel injection mode is adjusted for a long port fuel injection window. If the port fuel injection pulse is less than or equal to the threshold, the port fuel injection mode is adjusted for a short fuel injection window. Method 200 proceeds to 214 after the port fuel injection window is determined.

At 214, method 200 judges if the port fuel injection window is long. If so, the answer is yes and method 200 proceeds to 218. Otherwise, the answer is no and method 200 proceeds to 216.

Figure 6:
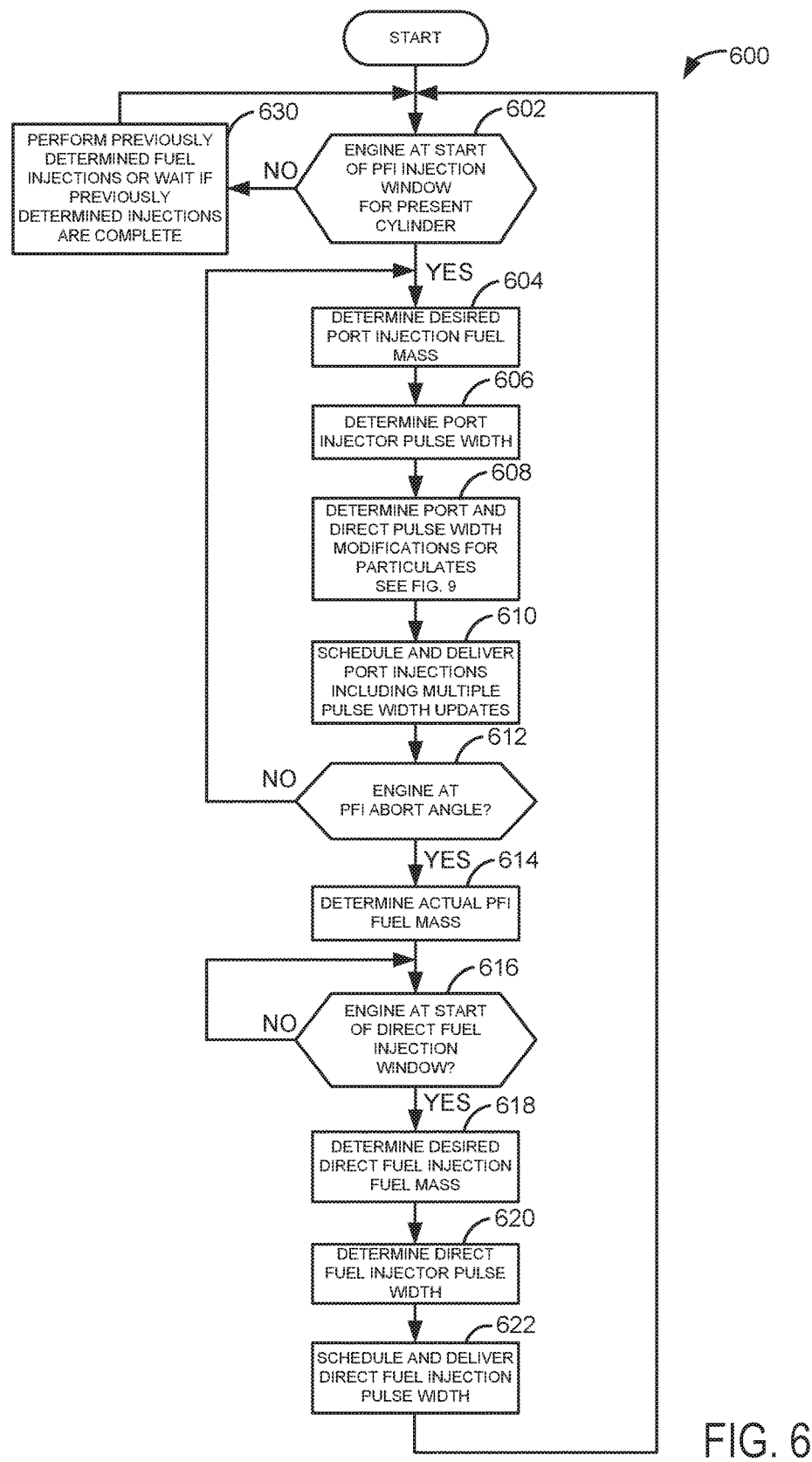
FIG. 6 shows an example method for injecting fuel to an engine with constraints that are based on a shorter port fuel injection window duration.

At 216, method 200 determines the port and direct fuel injection timings according to the method of FIG. 6. Method 200 proceeds to 220 after the port and direct fuel injection timing are determined.

Figure 4:
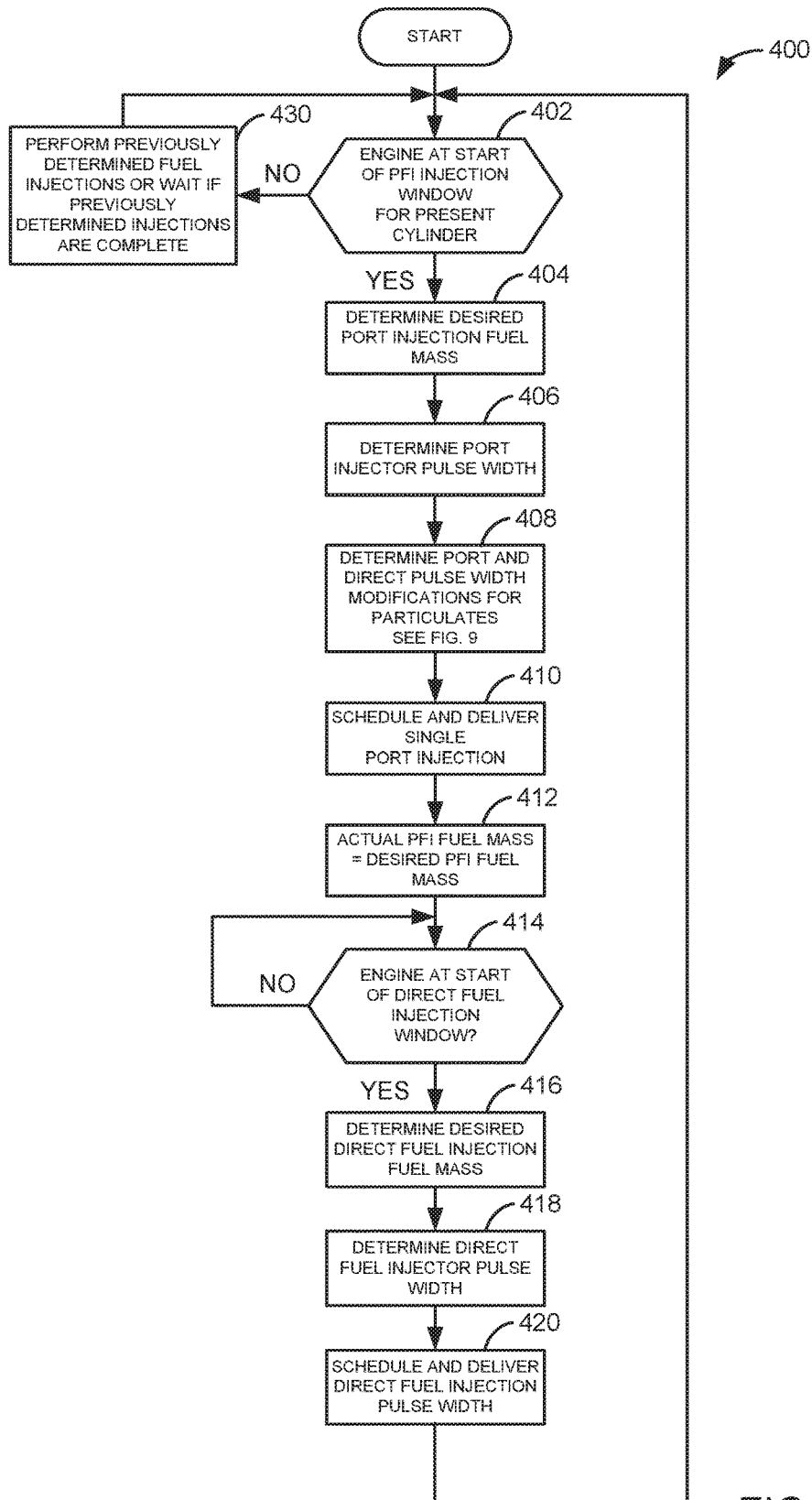
FIG. 4 shows an example method for injecting fuel to an engine with constraints that are based on a longer port fuel injection window duration.
Figure 5:
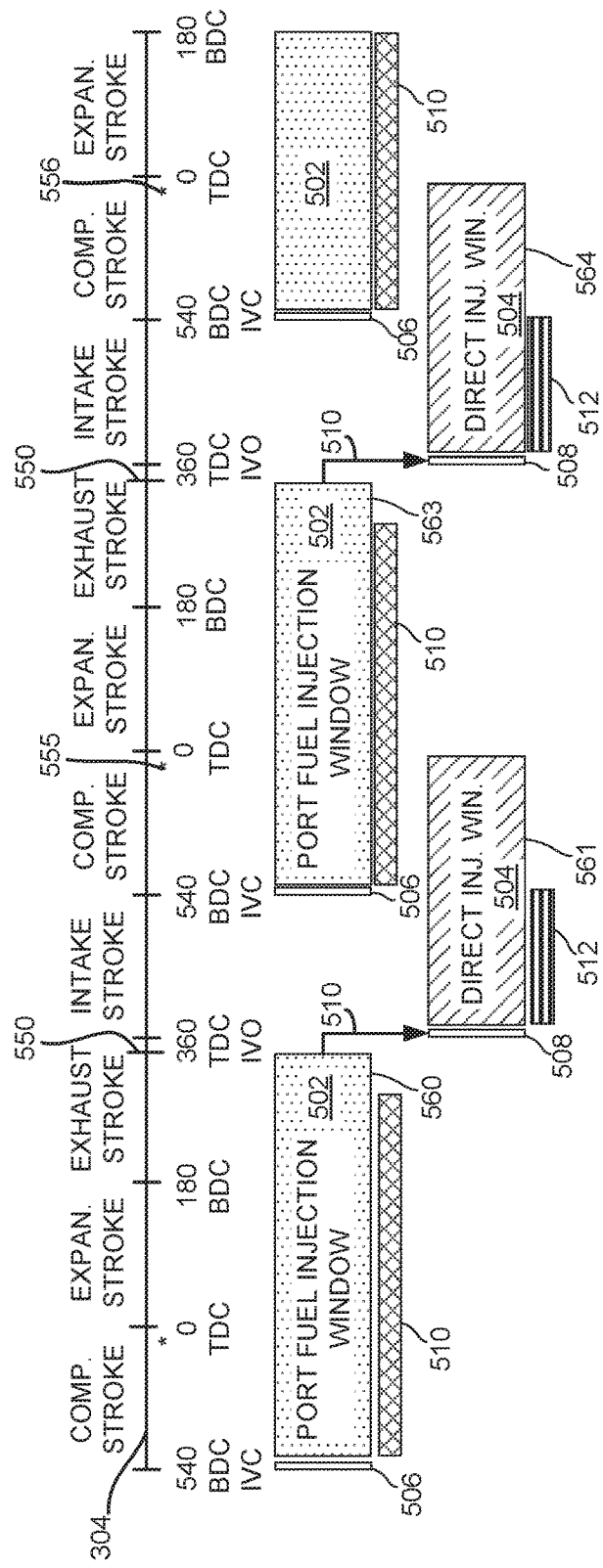
FIG. 5 shows a cylinder timing diagram that includes a shorter port fuel injection window duration.

At 218, method 200 determines the port and direct fuel injection timings according to the method of FIG. 4. Method 200 proceeds to 220 after the port and direct fuel injection timing are determined.

At 220, method 200 determines a desired cylinder air amount. The desired cylinder air amount is determined by multiplying the desired cylinder fuel amount determined at 206 by a desired cylinder air-fuel ratio. Method 200 proceeds to 222 after the desired cylinder air amount is determined.

At 222, method 200 determines modifications to port and direct fuel injection timings as described in the methods of FIGS. 9, 11, and 13. Method 200 proceeds to 224 after port and direct fuel injection timings are adjusted.

At 224, method 200 adjusts the cylinder air amounts and fuel injection amounts. In particular, method 200 adjusts engine throttle position and valve timings to provide the desired cylinder air amount as determined at 220. The throttle may be adjusted based on a throttle model and cam/valve timings may be adjusted based on empirically determined values stored in memory that are indexed via engine speed and the desired cylinder air amount. The port fuel injection pulse width and direct fuel injection pulse widths are output to the port fuel injector and the direct fuel injector of a cylinder in the cylinder's port and direct fuel injection windows. Method 200 proceeds to exit after the fuel injection pulse widths are output.

Referring now to FIG. 3, a cylinder timing diagram that includes a long port fuel injection window duration is shown. Timing line 304 begins at the left side of FIG. 3 and extends to the right side of FIG. 3. Time progresses from left to right. Each stroke of cylinder number one is shown as indicated above timing line 304. The strokes are separated by vertical lines. The sequence begins at a timing of 540 crankshaft degrees before top-dead-center compression stroke. Top-dead-center compression stroke is indicated as 0 crankshaft degrees. Each of the respective cylinder stroke are 180 crankshaft degrees. The piston in cylinder number one is at top-dead-center when the piston is at the locations along timing line 304 where TDC is displayed. The piston in cylinder number one is at bottom-dead-center when the piston is at the locations along timing line 304 where BDC is displayed. Intake valve closing locations are indicated by IVC. Intake valve opening locations are indicated by IVO. Combustion events are indicated by * marks.

Locations 350 indicate port injection abort angles. IVC and IVO locations may be different for different engines or when the engine is operated at a different speed and desired torque. Port fuel injection is scheduled at the area at location 306. The port fuel injection window is indicated by the shaded area at 302. Port fuel injection pulse widths are indicated by the shaded area at 310. Direct fuel injection is scheduled at the area at location 308. The direct fuel injection window is indicated by the shaded area at 304. Direct fuel injection pulse widths are indicated as the shaded area at 312.

A cylinder cycle may begin at TDC intake stroke and end at TDC intake stroke 720 crankshaft degrees later. Thus, as shown, the duration of a port fuel injection window with a direct fuel injection window extends for more than a single cylinder cycle. For example, port fuel injected in port fuel injection window 360 and direct fuel injected during direct fuel injection window 361 is combusted at 355. Similarly, port fuel injected in port fuel injection window 363 and direct fuel injected during direct fuel injection window 364 is combusted at 356.

Port fuel injection is first scheduled for a cylinder cycle at IVC (e.g., fuel delivered in window 360 of FIG. 3) of a cylinder cycle preceding a cylinder cycle where the port fuel injected is combusted (e.g., cylinder cycle of combustion event 355 of FIG. 3). Scheduling includes determining port fuel injection pulse width duration and storing the pulse width in a memory location that is accessed to activate and deactivate fuel injection driver circuitry. The port fuel injection window may start at IVC or immediately after port fuel injection scheduling near IVC. The port fuel injection window for a long port fuel injection window ends a predetermined number of crankshaft degrees before IVC for the cylinder cycle where the port injected fuel is combusted and a predetermined number of crankshaft degrees after IVO of the cylinder cycle where the port injected fuel is combusted. Thus, there may be a small number of crankshaft degrees between a port fuel injection window for a first cylinder cycle and a port fuel injection window for a second cylinder cycle. Further, the port fuel injection window may be advanced over several engine cycles as intake valve timing advances over several engine cycles. Additionally, port fuel injection window may be retarded over several engine cycles as intake valve timing is retarded over several engine cycles. No port fuel injection pulse width adjustments are provided during a cylinder cycle once the port fuel injection is scheduled for a long port fuel injection window. The port fuel injection pulse width may be shorter (e.g., as shown) than the port fuel injection window, or it may be as long as the port fuel injection window. If the port fuel injection pulse width is bigger than the port fuel injection window it is truncated to cease port fuel injection for the cylinder cycle at the end of the port fuel injection window.

Direct fuel injection is first scheduled for a cylinder cycle at IVO (e.g., fuel delivered during window 361 of FIG. 3) for the cylinder cycle where the direct injected fuel is combusted (e.g., combustion event 355 of FIG. 3). Scheduling includes determining direct fuel injection pulse width duration and storing the pulse width in a memory location that is accessed to activate and deactivate fuel injection driver circuitry. The direct fuel injection window may start at IVO or immediately after direct fuel injection scheduling near IVO. The direct fuel injection window for a cylinder cycle with a long port fuel injection window ends a predetermined number of crankshaft degrees before TDC compression stroke of the cylinder cycle where the direct injected fuel is combusted and a predetermined number of crankshaft degrees after BDC compression stroke of the cylinder cycle where the direct injected fuel is combusted. Thus, there may be a larger number of crankshaft degrees between a direct fuel injection window for a first cylinder cycle and a direct fuel injection window for a second cylinder cycle. Further, the direct fuel injection window starting time or crankshaft angle may be advanced over several engine cycles as intake valve timing advances over several engine cycles. Additionally, direct fuel injection window starting time or crankshaft angle may be retarded over several engine cycles as intake valve timing is retarded over several engine cycles. The direct fuel injection pulse width may be shorter (e.g., as shown) than the direct fuel injection window, or it may be as long as the direct fuel injection window. If the direct fuel injection pulse width is bigger than the direct fuel injection window it is truncated at the end of the direct fuel injection window to cease direct fuel injection for the cylinder cycle. The amount of fuel scheduled for direct injection at 308 is a desired cylinder fuel amount minus the amount of fuel scheduled for port injection at 306. Thus, the amount of directly injected fuel scheduled at 308 may be determined even though port fuel injection is ongoing at the time of direct injection fuel scheduling.

The longer port fuel injection window allows a greater amount of fuel to be inducted and combusted in a cylinder as compared to if only direct injection of fuel is allowed because the amount of directly injected fuel is limited by fuel pump capacity and the duration of intake and compression strokes. Additionally, since the amount of port fuel injected is known well before direct fuel injection is scheduled, the direct fuel injection may be scheduled to accurately supply the desired amount of fuel during a cylinder cycle.

Referring now to FIG. 4, a method for injecting fuel to an engine with constraints that are based on a long port fuel injection window duration is shown. The method of FIG. 4 operates in collaboration with the method of FIGS. 2 and 7. Further, at least portions of the method of FIG. 4 may be included as executable instructions in the system of FIGS. 1A and 1B. Additionally, portions of the method of FIG. 4 may be actions taken by controller 12 in the physical world to transform vehicle operating conditions. The steps of method 400 are described for a single cylinder receiving fuel during a cylinder cycle. Nevertheless, fuel injections for remaining engine cylinders may be determined in a similar way. Further, the method of FIG. 4 may provide the operating sequence of FIG. 3.

At 402, method 400 judges if the engine is at a crankshaft angle corresponding to a start of a long port fuel injection window for a particular cylinder for a combustion event where fuel that is to be injected during the port fuel injection window is combusted.

Engine intake valve and/or exhaust valve timing may constrain port and direct fuel injection timing because engine intake and exhaust valve timing may not strictly adhere to particular cylinder strokes. For example, intake valve opening time may be before or near top-dead-center intake stroke for some engine operating conditions. Conversely, during other engine operating conditions, intake valve opening time may be delayed more than thirty crankshaft degrees after top-dead-center intake stroke during other engine operating conditions. Further, it may not be desirable to directly inject fuel before IVO because the directly injected fuel may be expelled to the engine exhaust without participating in combustion within the engine. As such, it may be desirable to adjust fuel injection timing responsive to intake and exhaust valve opening and closing times or specific crankshaft positions or angles. Port and direct fuel injection windows provide one way of constraining port and direct fuel injection timings so that port and direct fuel injections do not occur at undesirable times and/or engine crankshaft locations so that fuel injected for one cylinder cycle does not enter the cylinder during an unintended different cylinder cycle. The port and direct fuel injection windows may be adjusted responsive to engine intake and exhaust opening and closing times or crankshaft angles.

A long port fuel injection window is an engine crankshaft interval where port fuel may be injected to a cylinder port during a cylinder cycle with no revisions to the port fuel injection pulse width possible while the long port fuel injection window is open (e.g., a time port fuel injection via the port fuel injector pulse width is permitted). The port fuel injection pulse width time or duration may be shorter or equal to the long port fuel injection window. If the port fuel injection pulse width exceeds the long port fuel injection window, the port fuel injection pulse width will be truncated so that port fuel injection ceases when the port fuel injector pulse width is not within the long port fuel injection window. The engine crankshaft location where the long port fuel injection window ends may be referred to as a port injection abort angle because the port fuel injection pulse is aborted at times or crankshaft angles after the port injection abort angle during a cylinder cycle. The long port fuel injection ending time or crankshaft angle is at or after an intake valve opening crankshaft angle of the cylinder receiving fuel during the cylinder cycle and before an intake valve closing crankshaft angle for the present cylinder cycle. The starting crankshaft angle of the port fuel injection pulse width is required to be at or after the start of the long port fuel injection window during a cylinder cycle. The starting crankshaft angle for the long port fuel injection window is at or later than (e.g., retarded from) an intake valve closing for a cylinder cycle previous to the cylinder cycle where the port injected fuel is combusted. The long port fuel injection window starting crankshaft angle and ending crankshaft angle may be empirically determined and stored in a table and/or function in memory that is indexed via engine speed and desired torque. Thus, the starting crankshaft angle and the ending crankshaft angle of the long port fuel injection window may change at a same amount or equally with intake valve timing of the cylinder receiving the port injected fuel.

In one example, the start of the long port fuel injection window crankshaft angle is IVC for a cylinder cycle before a cylinder cycle where the port injected fuel is combusted as is shown in FIG. 3. If method 400 judges that the engine is at the crankshaft angle corresponding to the start of the long port fuel injection window, the answer is yes and method 400 proceeds to 404. Otherwise, the answer is no and method 400 proceeds to 430.

At 430, method 400 performs previously determined fuel injections (e.g., port and direct fuel injections) or waits if previously determined fuel injections are complete. The previously determined fuel injections may be for the present cylinder or a different engine cylinder. Method 400 returns to 402 after performing previously scheduled fuel injections.

At 404, method 400 determines a desired fuel injection mass for a port fuel injector. Method 400 may retrieve the desired fuel injection mass for the port fuel injector from step 208 of FIG. 2 or calculate the port fuel mass as described in FIG. 2. Method 400 proceeds to 406 after determining the port fuel injection fuel mass.

At 406, method 400 determines a fuel injector pulse width for the port fuel injector. Method 400 may retrieve the port fuel injector pulse width from step 210 of FIG. 2 or calculate the port fuel injector pulse width as described in FIG. 2. Method 400 proceeds to 408 after the port fuel injector pulse width is determined.

At 408, method 400 determines port fuel injection pulse width modifications according to the method of FIG. 9. Method 400 proceeds to 410 after the port fuel injection pulse widths are modified.

At 410, method 400 schedules the port fuel injection pulse width. The port fuel injection is scheduled by writing the pulse width to a memory location that is a basis for activating the port fuel injector. The port fuel injection pulse width starting engine crankshaft angle for the cylinder cycle is the starting engine crankshaft angle of the long port fuel injector window, or it may be delayed a predetermined number of engine crankshaft degrees. The port fuel injector is activated and opened to allow fuel flow at the starting of the long port fuel injector window for the duration of the port fuel injector pulse width or the abort angle, whichever is earlier in time. Method 400 proceeds to 412 after the port fuel injection is scheduled and delivery begins.

At 412, method 400 equates the actual port fuel injection (PFI) fuel mass equal to a desired port fuel injection mass since port fuel injection updates are not provided and since the desired port fuel injection mass does not change after the port fuel injection pulse width is scheduled. Method 400 proceeds to 414 after determining the actual port fuel injection fuel mass.

At 414, method 400 judges if the engine is at a start of the direct fuel injection window. A direct fuel injection window is an engine crankshaft interval where fuel may be directly injected to a cylinder during a cylinder cycle. The direct fuel injection pulse width time or duration may be shorter or equal to the direct fuel injection window. If the direct fuel injection pulse width exceeds the direct fuel injection window, the direct fuel injection pulse width will be truncated so that direct fuel injection ceases at the end of the direct fuel injection window. The engine crankshaft location where the direct fuel injection window ends may be referred to as a direct injection abort angle because the direct fuel injection pulse is aborted at times or crankshaft angles after the direct injection abort angle during a cylinder cycle. The starting crankshaft angle of the direct fuel injection pulse width is required to be at or after (e.g., retarded from) the start of the direct fuel injection window during a cylinder cycle. The direct fuel injection window begins at or a predetermine number of crankshaft degrees after intake valve opening for the cylinder receiving the fuel. The direct fuel injection window ends at, or a predetermined number of engine crankshaft degrees, before top-dead-center compression stroke of the cylinder receiving the fuel and after the intake valve closing in the cylinder cycle when the directly injected fuel is combusted. The direct fuel injection window starting crankshaft angle and ending crankshaft angle may be empirically determined and stored in a table and/or function in memory that is indexed via engine speed and desired torque. Thus, the starting crankshaft angle and the ending crankshaft angle of the direct fuel injection window may change at a same amount or equally with intake valve timing of the cylinder receiving the port injected fuel.

In one example, the start of the direct fuel injection window crankshaft angle is IVO for a cylinder cycle where the direct injected fuel is combusted as is shown in FIG. 3. If method 400 judges that the engine is at the crankshaft angle corresponding to the start of the direct fuel injection window, the answer is yes and method 400 proceeds to 416. Otherwise, the answer is no and method 400 returns to 414.

At 416, method 400 determines a desired fuel injection mass for a direct fuel injector. Method 400 may retrieve the desired fuel injection mass for the direct fuel injector from step 208 of FIG. 2 or calculate the direct fuel mass as described in FIG. 2. Method 400 proceeds to 418 after determining the direct fuel injection fuel mass.

At 418, method 400 determines a fuel injector pulse width for the direct fuel injector. Method 400 may retrieve the direct fuel injector pulse width from step 210 of FIG. 2 or calculate the port fuel injector pulse width as described in FIG. 2. In particular, the direct fuel injection pulse width is adjusted to provide the desired mass of fuel determined at 206 minus the mass of port injected fuel determined at 412. The direct fuel injector pulse width is then determined via indexing a table or function that is indexed by a desired direct injection fuel mass and outputs a direct injector fuel pulse width. Method 400 proceeds to 420 after the direct fuel injector pulse width is determined.

At 420, method 400 schedules the direct fuel injection pulse width. The direct fuel injection is scheduled by writing the pulse width to a memory location that is a basis for activating the direct fuel injector. The direct fuel injection pulse width starting engine crankshaft angle for the cylinder cycle is the starting engine crankshaft angle of the direct fuel injector window, or it may be delayed a predetermined number of engine crankshaft degrees. The direct fuel injector is activated and opened to allow fuel flow at the starting of the direct fuel injector window for the duration of the direct fuel injector pulse width or the abort angle, whichever is earlier in time. Additionally, in some examples, the direct injection pulse width may be revised in the cylinder cycle in which it is injected based on air flow into the cylinder receiving the fuel while the intake valve of the cylinder is open. Method 400 proceeds to return to 402 after the direct fuel injection is scheduled and delivery begins.

Thus, the port and direct fuel injection windows are crankshaft intervals where respective port and direct fuel injection are permitted, and they bound fuel injection pulse widths to engine crankshaft angles where the injected fuel may participated in combustion for a particular cylinder cycle. The port and direct fuel injection windows prevent injected fuel from participating in combustion events of cylinder cycles that are not intended to receive the injected fuel. The port and direct fuel injection windows also operate to cease port and direct fuel injection if the port and/or direct fuel injection pulses are outside of the respective port and direct fuel injection windows.

Referring now to FIG. 5, a cylinder timing diagram that includes a short port fuel injection window duration is shown. Timing line 504 begins at the left side of FIG. 5 and extends to the right side of FIG. 5. Time progresses from left to right. Each stroke of cylinder number one is shown as indicated above timing line 504. The strokes are separated by vertical lines. The sequence begins at a timing of 540 crankshaft degrees before top-dead-center compression stroke. Top-dead-center compression stroke is indicated as 0 crankshaft degrees. Each of the respective cylinder stroke are 180 crankshaft degrees. The piston in cylinder number one is at top-dead-center when the piston is at the locations along timing line 504 where TDC is displayed. The piston in cylinder number one is at bottom-dead-center when the piston is at the locations along timing line 304 where BDC is displayed. Intake valve closing locations are indicated by IVC. Intake valve opening locations are indicated by IVO. Combustion events are indicated by * marks.

Locations 550 indicate port injection abort angles. IVC and IVO locations may be different for different engines or when the engine is operated at a different speed and desired torque. Port fuel injection is scheduled at the area at location 506. The port fuel injection window is indicated by the shaded area at 502. Port fuel injection pulse widths are indicated by the shaded area at 510. Direct fuel injection is scheduled at the area at location 508. The direct fuel injection window is indicated by the shaded area at 504. Direct fuel injection pulse widths are indicated as the shaded area at 512.

A cylinder cycle may begin at TDC intake stroke and end at TDC intake stroke 720 crankshaft degrees later. Thus, as shown, the duration of a port fuel injection window with a direct fuel injection window extends for more than a single cylinder cycle. For example, port fuel injected in port fuel injection window 560 and direct fuel injected during direct fuel injection window 561 is combusted at 555. Similarly, port fuel injected in port fuel injection window 563 and direct fuel injected during direct fuel injection window 564 is combusted at 556.

Port fuel injection is first scheduled for a cylinder cycle at IVC (e.g., fuel delivered in window 560 of FIG. 5) of a cylinder cycle preceding a cylinder cycle where the port fuel injected is combusted (e.g., cylinder cycle of combustion event 555 of FIG. 5). Scheduling includes determining port fuel injection pulse width duration and storing the pulse width in a memory location that is accessed to activate and deactivate fuel injection driver circuitry. The port fuel injection window may start at IVC or immediately after port fuel injection scheduling near IVC. The port fuel injection window for a short port fuel injection window ends a predetermined number of crankshaft degrees before IVO for the cylinder cycle where the port injected fuel is combusted. Thus, there may be a larger number of crankshaft degrees between a port fuel injection window for a first cylinder cycle and a port fuel injection window for a second cylinder cycle for a short duration port fuel injection window as compared to a long port fuel injection window.

Further, the port fuel injection window may be advanced over several engine cycles as intake valve timing advances over several engine cycles. Additionally, port fuel injection window may be retarded over several engine cycles as intake valve timing is retarded over several engine cycles. A plurality of port fuel injection pulse width adjustments may be provided during a cylinder cycle once the port fuel injection is scheduled for a short port fuel injection window. The port fuel injection pulse width may be shorter (e.g., as shown) than the port fuel injection window, or it may be as long as the port fuel injection window. If the port fuel injection pulse width is bigger than the port fuel injection window it is truncated to cease port fuel injection for the cylinder cycle at the end of the port fuel injection window.

Direct fuel injection is first scheduled for a cylinder cycle at IVO (e.g., fuel delivered during window 561 of FIG. 5) of the cylinder cycle where the direct injected fuel is combusted (e.g., combustion event 555 of FIG. 5). Scheduling includes determining direct fuel injection pulse width duration and storing the pulse width in a memory location that is accessed to activate and deactivate fuel injection driver circuitry. The direct fuel injection window may start at IVO or immediately after direct fuel injection scheduling near IVO. The direct fuel injection window for a cylinder cycle with a short port fuel injection window ends a predetermined number of crankshaft degrees before TDC compression stroke of the cylinder cycle where the direct injected fuel is combusted and a predetermined number of crankshaft degrees after BDC compression stroke of the cylinder cycle where the direct injected fuel is combusted. Thus, there may be a larger number of crankshaft degrees between a direct fuel injection window for a first cylinder cycle and a direct fuel injection window for a second cylinder cycle.

Further, the direct fuel injection window starting time or crankshaft angle may be advanced over several engine cycles as intake valve timing advances over several engine cycles. Additionally, direct fuel injection window starting time or crankshaft angle may be retarded over several engine cycles as intake valve timing is retarded over several engine cycles. The direct fuel injection pulse width may be shorter (e.g., as shown) than the direct fuel injection window, or it may be as long as the direct fuel injection window. If the direct fuel injection pulse width is bigger than the direct fuel injection window it is truncated to cease port fuel injection for the cylinder cycle at the end of the direct fuel injection window. The amount of fuel scheduled for direct injection at 508 is a desired cylinder fuel amount minus the amount of fuel port injected for the duration of the short port fuel injection window including port fuel injection pulse width adjustments made as the engine rotates. The total amount of port injected fuel is output at abort angle 550 or sooner in the cylinder cycle and it is the basis for scheduling direct fuel injection at 508. Thus, the amount of directly injected fuel scheduled at 508 may be determined based on multiple updates to the port fuel injection pulse width during the cylinder cycle.

The shorter port fuel injection window allows port fuel injection to cease before direct fuel injection is scheduled for the cylinder cycle. This allows the direct fuel injection amount to be adjusted based on the adjusted amount of port fuel injected to the engine during the cylinder cycle in which the fuel is directly injected. Leaders 510 indicate that feedback (e.g., latest port fuel injection pulse width duration and fuel pressure) may be a basis for adjusting the amount of fuel directly injected so that the desired amount of fuel enters the cylinder even though the port fuel injection pulse width was updated a plurality of times.

Referring now to FIG. 6, a method for injecting fuel to an engine with constraints that are based on a short port fuel injection window duration is shown. The method of FIG. 6 operates in collaboration with the method of FIGS. 2 and 7. Further, at least portions of the method of FIG. 6 may be included as executable instructions in the system of FIGS. 1A and 1B. Additionally, portions of the method of FIG. 6 may be actions taken by controller 12 in the physical world to transform vehicle operating conditions. The steps of method 600 are described for a single cylinder receiving fuel during a cylinder cycle. Nevertheless, fuel injections for remaining engine cylinders may be determined in a similar way. Further, the method of FIG. 6 may provide the operating sequence of FIG. 5.

At 602, method 600 judges if the engine is at a crankshaft angle corresponding to a start of a short port fuel injection window for a particular cylinder for a combustion event where fuel that is to be injected during the port fuel injection window is combusted.

A short port fuel injection window is an engine crankshaft interval where port fuel may be injected to a cylinder port during a cylinder cycle with multiple revisions to the port fuel injection pulse width possible while the short port fuel injection window is open (e.g., a time port fuel injection is permitted). The port fuel injection pulse width time or duration may be shorter or equal to the short port fuel injection window. If the port fuel injection pulse width exceeds the short port fuel injection window, the port fuel injection pulse width will be truncated or ceased at the end of the short port fuel injection window.

The engine crankshaft location where the short port fuel injection window ends may be referred to as a port injection abort angle because the port fuel injection pulse is aborted at times or crankshaft angles after the port injection abort angle during a cylinder cycle. The short port fuel injection ending time or crankshaft angle is at or before intake valve opening crankshaft angle of the cylinder receiving fuel during the cylinder cycle. The starting crankshaft angle of the port fuel injection pulse width is required to be at or after the start of the short port fuel injection window during a cylinder cycle. The starting crankshaft angle for the short port fuel injection window is at or later than (e.g., retarded from) an intake valve closing for a cylinder cycle previous to the cylinder cycle where the port injected fuel is combusted. The short port fuel injection window starting crankshaft angle and ending crankshaft angle may be empirically determined and stored in a table and/or function in memory that is indexed via engine speed and desired torque.

In one example, the start of the short port fuel injection window crankshaft angle is IVC for a cylinder cycle before a cylinder cycle where the port injected fuel is combusted as is shown in FIG. 5. If method 600 judges that the engine is at the crankshaft angle corresponding to the start of the short port fuel injection window, the answer is yes and method 600 proceeds to 604. Otherwise, the answer is no and method 600 proceeds to 630.

At 630, method 600 performs previously determined fuel injections (e.g., port and direct fuel injections) or waits if previously determined fuel injections are complete. The previously determined fuel injections may be for the present cylinder or a different engine cylinder. Method 600 returns to 602 after performing previously scheduled fuel injections.

At 604, method 600 determines a desired fuel injection mass for a port fuel injector. Method 600 may retrieve the desired fuel injection mass for the port fuel injector from step 208 of FIG. 2 or calculate the port fuel mass as described in FIG. 2. Method 600 proceeds to 606 after determining the port fuel injection fuel mass.

At 606, method 600 determines a fuel injector pulse width for the port fuel injector. Method 600 may retrieve the port fuel injector pulse width from step 210 of FIG. 2 or calculate the port fuel injector pulse width as described in FIG. 2. Method 600 proceeds to 608 after the port fuel injector pulse width is determined.

At 608, method 600 determines port fuel injection pulse width modifications according to the method of FIG. 9. Method 600 proceeds to 610 after the port fuel injection pulse widths are modified.

At 610, method 600 schedules the port fuel injection pulse width. The port fuel injection is scheduled by writing the pulse width to a memory location that is a basis for activating the port fuel injector. The port fuel injection pulse width starting engine crankshaft angle for the cylinder cycle is the starting engine crankshaft angle of the short port fuel injector window, or it may be delayed a predetermined number of engine crankshaft degrees. The port fuel injector is activated and opened to allow fuel flow at the starting of the short port fuel injector window for the duration of the port fuel injector pulse width or the abort angle, whichever is earlier in time. Method 600 proceeds to 612 after the port fuel injection is scheduled and delivery begins.

At 612, method 600 judges if the engine is at the port fuel injection (PFI) abort angle for the present engine cylinder receiving fuel. In one example as shown in FIG. 5, the abort angle is a predetermined number of crankshaft degrees before intake valve opening during the cycle the cylinder receives the fuel. If method 600 judges that the engine is at the port fuel injection abort angle, the answer is yes and method 600 proceeds to 614. Otherwise, method 600 returns to 604 where the port fuel injection pulse width may be revised.

At 614, method 600 determines the total time the port fuel injector was on during the short fuel injection window by adding together the total time the port fuel injector was activated or open during the port fuel injection window. The total time is used to index a transfer function describing port fuel injector flow and the transfer function outputs a mass of fuel injected during port fuel injection. Method 600 proceeds to 616 after determining the actual port fuel injection fuel mass.

At 616, method 600 judges if the engine is at a start of the direct fuel injection window. A direct fuel injection window is an engine crankshaft interval where fuel may be directly injected to a cylinder during a cylinder cycle. The direct fuel injection pulse width time or duration may be shorter or equal to the direct fuel injection window. If the direct fuel injection pulse width exceeds the direct fuel injection window, the direct fuel injection pulse width will be truncated so that direct fuel injection for the cylinder cycle ceases at the end of the direct fuel injection window. The engine crankshaft location where the direct fuel injection window ends may be referred to as a direct injection abort angle because the direct fuel injection pulse is aborted at times or crankshaft angles after the direct injection abort angle during a cylinder cycle. The starting crankshaft angle of the direct fuel injection pulse width is required to be at or after (e.g., retarded from) the start of the direct fuel injection window during a cylinder cycle. The direct fuel injection window begins at or a predetermine number of crankshaft degrees after intake valve opening for the cylinder receiving the fuel. The direct fuel injection window ends at, or a predetermined number of engine crankshaft degrees, before top-dead-center compression stroke of the cylinder receiving the fuel and after the intake valve closing in the cylinder cycle when the directly injected fuel is combusted. The direct fuel injection window starting crankshaft angle and ending crankshaft angle may be empirically determined and stored in a table and/or function in memory that is indexed via engine speed and desired torque. Thus, the starting crankshaft angle and the ending crankshaft angle of the direct fuel injection window may change at a same amount or equally with intake valve timing of the cylinder receiving the port injected fuel.

In one example, the start of the direct fuel injection window crankshaft angle is IVO for a cylinder cycle where the direct injected fuel is combusted as is shown in FIG. 5. If method 600 judges that the engine is at the crankshaft angle corresponding to the start of the direct fuel injection window, the answer is yes and method 600 proceeds to 618. Otherwise, the answer is no and method 600 returns to 616.

At 618, method 600 determines a desired fuel injection mass for a direct fuel injector. Method 600 may retrieve the desired fuel injection mass for the direct fuel injector from step 208 of FIG. 2 or calculate the direct fuel mass as described in FIG. 2. Method 600 proceeds to 620 after determining the direct fuel injection fuel mass.

At 620, method 600 determines a fuel injector pulse width for the direct fuel injector. Method 600 may retrieve the direct fuel injector pulse width from step 210 of FIG. 2 or calculate the port fuel injector pulse width as described in FIG. 2. In particular, the direct fuel injection pulse width is adjusted to provide the desired mass of fuel determined at 206 minus the mass of port injected fuel determined at 612. The direct fuel injector pulse width is then determined via indexing a table or function that is indexed by a desired direct fuel injection fuel mass and outputs a direct fuel injection fuel pulse width. Additionally, in some examples, the direct injection pulse width may be revised in the cylinder cycle in which it is injected based on air flow into the cylinder receiving the fuel while the intake valve of the cylinder is open. Method 600 proceeds to 622 after the direct fuel injector pulse width is determined.

At 622, method 600 schedules the direct fuel injection pulse width. The direct fuel injection is scheduled by writing the pulse width to a memory location that is a basis for activating the direct fuel injector. The direct fuel injection pulse width starting engine crankshaft angle for the cylinder cycle is the starting engine crankshaft angle of the direct fuel injector window, or it may be delayed a predetermined number of engine crankshaft degrees. The direct fuel injector is activated and opened to allow fuel flow at the starting of the direct fuel injector window for the duration of the direct fuel injector pulse width or the abort angle, whichever is earlier in time. Method 600 proceeds to return to 602 after the direct fuel injection is scheduled and delivery begins.

Referring now to FIG. 7, a method for providing short and long port fuel injection windows and transitioning between the windows is shown. The method of FIG. 7 may provide the operating sequence shown in FIG. 8. Further, at least portions of the method of FIG. 7 may be included as executable instructions in the system of FIGS. 1A and 1B. Additionally, portions of the method of FIG. 7 may be actions taken by controller 12 in the physical world to transform vehicle operating conditions. The steps of method 700 are described for a single cylinder receiving fuel during a cylinder cycle. Nevertheless, fuel injections for remaining engine cylinders may be determined in a similar way.

At 702, method 700 begins with providing short port fuel injection windows and direct fuel injection windows. An example short port fuel injection window is shown in FIG. 5. A port fuel injection abort angle is provided before an engine crankshaft angle where direct fuel injection is scheduled (e.g., IVO during the cylinder cycle where the direct fuel is injected). Additionally, the port fuel injection pulse width or pulse widths may be updated a plurality of times during the cycle the cylinder receives the port injected fuel. Feedback of an amount of port fuel injector on time during the port fuel injection window for the cylinder cycle is also provided for scheduling direct fuel injection after the port fuel injection during a same cylinder cycle. There is no limit on a number of port fuel injection pulses for the cylinder in the port fuel injection window for the cylinder cycle. Method 700 proceeds to 704 after short port fuel injection windows and direct fuel injection windows are established at 702.

At 704, method 700 judges if a port fuel injection pulse width for a cylinder cycle is greater than a threshold. If not, the answer is no and method 700 returns to 702. Otherwise, the answer is yes and method 700 proceeds to 706.

At 706, method 700 begins to transition to providing long port fuel injection windows and direct fuel injection windows. During the transition to long port fuel injection windows, the port fuel injection window is short and a port fuel injection abort angle is provided after an engine crankshaft angle where direct fuel injection is scheduled (e.g., IVO for the cylinder cycle where the direct fuel is injected). Additionally, the port fuel injection pulse width or pulse widths may not be updated a plurality of times during the cycle the cylinder receives the port injected fuel. Feedback of an amount of port fuel injector on time during the port fuel injection window for the cylinder cycle is not provided for scheduling direct fuel injection. Instead, the direct fuel injection pulse width is based on the port fuel injection pulse width schedules at the beginning of the port fuel injection window and the desired cylinder fuel amount. Only one port fuel injection pulse width for the cylinder is provided in the port fuel injection window during the cylinder cycle. Method 700 proceeds to 708 after short port fuel injection windows and direct fuel injection windows are established at 706.

At 708, method 700 judges if all port fuel injection abort angles for all engine cylinders have been moved to a more retarded timing. If not, the answer is no and method 700 returns to 706. Otherwise, the answer is yes and method 700 proceeds to 710.

At 710, method 700 begins with providing long port fuel injection windows and direct fuel injection windows. An example long port fuel injection window is shown in FIG. 3. A port fuel injection abort angle is provided after an engine crankshaft angle where direct fuel injection is scheduled (e.g., IVO during the cylinder cycle where the direct fuel is injected) and before IVC for the cylinder receiving the fuel. Additionally, the port fuel injection pulse width or pulse widths may not be updated during the cycle the cylinder receives the port injected fuel. Feedback of an amount of port fuel injector on time during the port fuel injection window for the cylinder cycle is not provided for scheduling direct fuel injection during a same cylinder cycle. There is a limit of only one port fuel injection pulse for the cylinder in the port fuel injection window for the cylinder cycle. Method 700 proceeds to 712 after long port fuel injection windows and direct fuel injection windows are established at 710.

At 712, method 700 judges if a port fuel injection pulse width for a cylinder cycle is less than or equal the threshold. If not, the answer is no and method 700 returns to 710. Otherwise, the answer is yes and method 700 proceeds to 714.

At 714, method 700 begins to transition to providing short port fuel injection windows and direct fuel injection windows. During the transition to short port fuel injection windows, the port fuel injection window is short and a port fuel injection abort angle is move to before an engine crankshaft angle where direct fuel injection is scheduled (e.g., IVO for the cylinder cycle where the direct fuel is injected). Further, the port fuel injection pulse width or pulse widths may not be updated a plurality of times during the cycle the cylinder receives the port injected fuel. Feedback of an amount of port fuel injector on time during the port fuel injection window for the cylinder cycle is not provided for scheduling direct fuel injection. Instead, the direct fuel injection pulse width is based on the port fuel injection pulse width schedules at the beginning of the port fuel injection window and the desired cylinder fuel amount. Only one port fuel injection pulse width for the cylinder is provided in the port fuel injection window during the cylinder cycle. Method 700 proceeds to 716 after short port fuel injection windows and direct fuel injection windows are established at 714.

At 716, method 700 judges if all port fuel injection abort angles for all engine cylinders have been moved to a more advanced timing. If not, the answer is no and method 700 returns to 714. Otherwise, the answer is yes and method 700 returns to 702.

In this way, method 700 adjusts abort angles and port fuel injections so that port fuel injection windows transition between longer and shorter durations. A transition between modes is complete when all abort angles have been moved to new crankshaft angles.

Referring now to FIG. 8, an example sequence of transitioning between short and long port fuel injection windows according to the method of FIG. 7 is shown. Vertical markers at T1-T3 represent times of interest during the sequence. The plots are time aligned. The sequence of FIG. 8 may be provided by the system of FIG. 7 executing instructions based on the method of FIG. 7.

The first plot from the top of FIG. 8 is a plot of desired torque versus time. The vertical axis represents desired torque and desired torque increases in the direction of the vertical axis arrow. The horizontal axis represents time and time increases from the right side of the plot to the left side of the plot.

The second plot from the top of FIG. 8 is a plot of engine speed versus time. The vertical axis represents engine speed and engine speed increases in the direction of the vertical axis arrow. The horizontal axis represents time and time increases from the right side of the plot to the left side of the plot.

The third plot from the top of FIG. 8 is a plot of port fuel injector pulse width versus time. The vertical axis represents port fuel injector pulse width and port fuel injection pulse width increases in the direction of the vertical axis arrow. The horizontal axis represents time and time increases from the right side of the plot to the left side of the plot. Horizontal line 802 represents a threshold pulse width above which long port fuel injector windows are provided and below which short port fuel injector windows are provided.

The fourth plot from the top of FIG. 8 is a plot of port fuel injector (PFI) fuel injection window state versus time. The vertical axis represents PFI fuel injection window state. The PFI window is long when the trace is at a higher level near the vertical axis arrow. The PFI window is short when the trace is at a lower level near the horizontal axis. The horizontal axis represents time and time increases from the right side of the plot to the left side of the plot.

At time T0, the desired torque is low, engine speed is low, the port fuel injection pulse width is less than threshold 802, and the PFI window duration is short. Such conditions may be present during engine idle conditions.

At time T1, the desired torque begins to increase and the port fuel injection pulse width begins to increase with the desired torque. The desired torque increases in response to a driver applying an accelerator pedal. The engine speed also begins to increase and the PFI window duration remains short.

At time T2, the desired torque has increased to a level where the port fuel injection pulse width is greater than threshold 802. The PFI window transitions to a long window in response to the port fuel injection pulse width exceeding threshold 802. The engine speed continues to increase as the desired torque continues to increase.

Between time T2 and time T3, the desired torque levels off to a constant value and then begins to decrease. The engine speed changes due to transmission gear shifting and then decreases as the desired torque decreases. The port fuel injection pulse width increases with desired torque and then decreases as desired torque decreases. The PFI injection window remains long.

At time T3, the port fuel injection pulse width decreases to a value less than threshold 802. Consequently, the PFI injection window transitions from long to short. The desired torque continues to decrease as does the engine speed.

In this way, port fuel injection windows may transition between short and long durations. The longer duration windows provide for increasing the amount of port injected fuel while the short duration windows provide for updating the amount of port injected fuel for changing engine operating conditions.

Referring now to FIG. 9, an example method for adjusting fractions of port injected fuel and direct injected fuel to reduce particulate matter produced by an engine is shown. The method of FIG. 9 may provide the operating sequence shown in FIG. 10. Additionally, at least portions of the method of FIG. 9 may be included as executable instructions in the system of FIGS. 1A and 1B. Further, portions of the method of FIG. 9 may be actions taken by controller 12 in the physical world to transform vehicle operating conditions.

At 902, method 900 judges whether or not the vehicle in which an engine operates is being operated with an alternative calibration. The alternative calibration may be comprised of engine control parameters (e.g., a group of pre-customer delivery control parameters) with which the engine is operated before the vehicle and engine are delivered to a customer. The alternative calibration may be active during vehicle manufacture and transportation to the retail sales location. A nominal calibration (e.g., a group of post-customer delivery control parameters) may be activated at the retail sales location for delivery to the customer. The alternative calibration may be active for a predetermined number of engine starts or until the vehicle has driven a predetermined distance (e.g., 1 Km). If method 900 judges that the engine is operating with an alternative calibration, the answer is yes and method 900 proceeds to 904. Otherwise, the answer is no and method 900 proceeds to 906.

At 904, method 900 increases a fraction of port injected fuel for at least some engine operating conditions as compared to if the engine were operated with the nominal calibration provided to the customer. The port injected fuel fraction may be increased by a constant value, or alternatively, a table or function may increase the port injected fuel fraction based on engine speed and desired torque. By increasing the port injected fuel fraction, the engine may produce less carbonaceous soot so that particulate filter loading may be reduced before delivery of the vehicle to a customer. For example, a base engine calibration may provide a port fuel injection fraction of 20% and a direct fuel injection fraction of 80% for an engine speed of 1000 RPM and desired torque of 50 N-m. Method 900 may increase the port fuel injection fraction to 30% and decrease the direct fuel injection fraction to 70% of the total amount of fuel injected at the same 1000 RPM and 50 N-m operating conditions. However, the cylinder's air-fuel ratio for a same engine speed and load before and after the port fuel injection fraction is adjusted is the same. Further, since the vehicle may be operated inside of an enclosed building during manufacture, it may be desirable to reduce soot production by the engine. Method 900 proceeds to exit after a fraction of port fuel injected to an engine is increased as compared to a fraction of port injected fuel provided by a nominal calibration.

At 906, method 900 judges whether or not a loading of a particulate filter in a vehicle exhaust system is greater than a threshold amount. In other words, method 900 judges if an amount of soot collected in a particulate filter is greater than a threshold. The amount of soot accumulation in the particulate filter may be estimated based of a pressure drop across the particulate filter or from a model of engine soot output and particulate filter storage efficiency. If method 900 judges that the more than a threshold amount of soot is accumulated in the particulate filter, the answer is yes and method 900 proceeds to 908. Otherwise, the answer is no and method 900 proceeds to 910.

At 908, method 900 increases a fraction of port injected fuel for at least some engine operating conditions as compared to if the engine were operated with less than the threshold amount of soot accumulated in the particulate filter. The port injected fuel fraction may be increased by a constant value, or alternatively, a table or function may increase the port injected fuel fraction proportionately with an amount of soot accumulated in the particulate filter. For example, if soot accumulated in the particulate filter is greater than a threshold value and increases further by 10%, the fraction of port injected fuel may increase from a fraction of 10% to a fraction of 20% and the fraction of direct injected fuel may decrease from a fraction of 90% to a fraction of 80%. By increasing the port injected fuel fraction, the engine may produce less carbonaceous soot so that particulate filter loading may be reduced before the particulate filter may be purged of soot. Additionally, a port fuel injection abort angle may be advanced in response to an increase in particulate matter stored in the particulate filter and vice-versa. Likewise, a port fuel injection window duration may be adjusted responsive to an amount of soot stored in the particulate filter (e.g., decreased as the amount of stored particulate matter increases and vice-versa). Method 900 proceeds to exit after a fraction of port fuel injected to an engine is increased as compared to a fraction of port injected fuel injected when soot accumulated in the particulate filter is less than the threshold.

At 910, method 900 judges whether or not the vehicle in which the engine operates is in a low particulate environment (e.g., an environment beyond the vehicle such as a garage). A low particulate environment may include but is not limited to an enclosed building, a parking garage, an urban area with a population density greater than a threshold amount, or a road where vehicle speed and/or acceleration are limited to less than predetermined thresholds. Method 900 may judge that the vehicle is in a parking garage or enclosed building via vehicle sensors such as a global positioning system (GPS) receiver, vehicle camera, vehicle lasers, vehicle sonic devices, or radar. Method 900 may judge that the vehicle is in an urban area or an operating on a road where vehicle speed/acceleration are limited to less than predetermined thresholds via the GPS receiver. Further, method 900 may judge that the vehicle is operating in a low particulate environment if vehicle speed is less than a threshold value for more than a threshold amount of time. If method 900 judges that the vehicle and engine are operating in a low particulate environment, the answer is yes and method 900 proceeds to 912. Otherwise, the answer is no and method 900 proceeds to 914.

At 912, method 900 increases a fraction of port injected fuel for at least some engine operating conditions as compared to if the engine were not operating within a low particulate environment. The port injected fuel fraction may be increased by a constant value, or alternatively, a table or function may increase the port injected fuel fraction based on engine speed and desired torque. For example, the engine is operating in a low particulate environment, such as an urban area, the fraction of port injected fuel may increase from a value of 60% to a value of 75% and the directly injected fuel fraction may decrease from a value of 40% to a value of 25% so that a same engine air-fuel ratio is provided for a same engine speed and load before and after adjusting the port fuel injection fraction. By increasing the port injected fuel fraction, the engine may produce less carbonaceous soot so that the possibility of releasing soot to the atmosphere may be reduced. Method 900 proceeds to exit after a fraction of port fuel injected to an engine is increased as compared to a fraction of port injected fuel injected when the engine is not operated in a low particulate environment. Of course, additional conditions or geographical locations may be deemed low particulate environments.

At 914, method 900 operates the engine with nominal port fuel injection and direct fuel injection fractions (e.g., port and direct fuel injection fractions not adjusted for operating environment or particulate filter loading, such as a base engine and vehicle calibration). If the engine were previously operating in a low particulate environment, the port fuel injection fraction may be reduced to provide a nominal port fuel injection fraction of a base vehicle calibration. Method 900 proceeds to exit after the engine's port and direct fuel injection fractions are adjusted.

In this way, an amount of particulate matter produced by an engine may be adjusted for environmental conditions and particulate filter loading. By reducing particulate matter formation, it may be possible to delay particulate filter purging until the vehicle reaches conditions that may be more suitable for particulate filter purging. Further, for each of the steps of method 900 where the port fuel injection fraction is increased, the direct fuel injection fraction is decreased so that a same amount of fuel is injected to the cylinder for a same group of engine operating conditions. Consequently, the engine air-fuel ratio is not affected by increasing the port fuel injection fraction.

Referring now to FIG. 10, an example operating sequence according to the method of FIG. 9 is shown. The operating sequence of FIG. 10 may be provided by the system of FIGS. 1A and 1B including the method of FIG. 9 as executable instructions.

The first plot from the top of FIG. 10 is a plot of particulate matter load or an amount of particulate matter stored in a particulate filter versus time. The vertical axis represents particulate matter load and particulate matter load increases in the direction of the vertical axis arrow. The horizontal axis represents time and time increases from the right side of the plot to the left side of the plot. Horizontal line 1002 represents a threshold particulate filter load above which it may be desirable to reduce particulate formation by the engine.

The second plot from the top of FIG. 10 is a plot of particulate matter purge state versus time. The particulate matter filter is being purged of particulate matter when the trace is at a higher level near the vertical axis arrow. The particulate matter filter is not being purged of particulate matter when the trace is at a lower level near the horizontal axis. The horizontal axis represents time and time increases from the right side of the plot to the left side of the plot.

The third plot from the top of FIG. 10 is a plot of the particulate matter environment in which the engine and vehicle are operating. The vertical axis represents particulate environment. The engine and vehicle are operating in a low particulate environment when the trace is at a higher level near the vertical axis arrow. The engine and vehicle are operating in a higher or nominal particulate environment when the trace is at a lower level near the horizontal axis. The horizontal axis represents time and time increases from the right side of the plot to the left side of the plot.

The fourth plot from the top of FIG. 10 is a plot of port fuel injector (PFI) fuel injection fraction versus time. The vertical axis represents PFI fuel injection fuel fraction and the PFI fuel injection fraction increases in the direction of the vertical axis arrow. The horizontal axis represents time and time increases from the right side of the plot to the left side of the plot.

At time T5, the particulate filter load is less than threshold 1002 and increasing. The particulate filter is not being purged as is indicated by the low particulate filter purge state trace. The vehicle and engine are operating in a nominal particulate environment and the port fuel injection (PFI) fraction is at a middle level.

At time T6, the particulate filter load exceeds threshold 1002 as the engine continues to produce particulate matter. The PFI injection fraction is increased and the direct fuel injection fraction is decreased (not shown) so that the engine operates with the same air-fuel ratio, but with a greater fraction of port injected fuel. The particulate environment is nominal and the particulate filter is not being purged.

At time T7, the particulate filter starts being purged. The particulate filter may be purged when the engine achieves a predetermined speed and desired torque or other specified conditions. The particulate matter filter may be purged via increasing a temperature of the particulate filter via retarding engine spark timing. The particulate filter load is decreased in response to the particulate filter entering purge mode. The particulate matte environment is nominal and the PFI injection fraction remains at an increased fraction.

At time T8, the particulate filter load has decreased to a lower level. The particulate filter exits purge mode in response to the low particulate filter load and PFI injection fraction is decreased. The vehicle continues to operate in a nominal particulate environment. It should be noted that in other examples the PFI injection fraction may be reduces as soon as the particulate load is less than threshold 1002.

At time T9, the vehicle and engine enter a low particulate environment such as an enclosed building or urban area as indicated by the particulate environment trace transitioning to a higher level. The particulate filter load remains low and the particulate filter is not being purged. The PFI fraction is increased and the direct injection fraction is decreased to maintain engine air-fuel ratio and reduce particulate formation within the engine. In this way, the engine air-fuel ratio may remain a same value for a same engine speed and driver demand.

At time T10, the vehicle and engine exit the low particulate environment and the particulate environment trace transitions to a lower level. The particulate filter load remains low and the particulate filter is not being purged. The PFI fraction is decreased and the direct injection fraction is increased to improve cylinder charge cooling. Thus, the direct fuel injection fraction may be increased and the port fuel injection fraction may be decreased when the vehicle is operating in a nominal particulate environment so that higher engine torque levels may be achieved.

Referring now to FIG. 11, an example method for compensating port fuel injector degradation is shown. The method of FIG. 11 may provide the operating sequence shown in FIG. 12. Additionally, at least portions of the method of FIG. 11 may be included as executable instructions in the system of FIGS. 1A and 1B. Further, portions of the method of FIG. 11 may be actions taken by controller 12 in the physical world to transform vehicle operating conditions.

At 1102, method 1100 judges whether or not the port fuel injector degradation or reduced performance is present. Further, if port injector degradation is determined, method 1100 may determine the particular port fuel injector that is degraded. In one example, method 1100 may judge that port fuel injector degradation is present if engine air-fuel ratio is more than a predetermined air-fuel ratio away from a desired engine air-fuel ratio. Alternatively, method 1100 may judge whether or not there is port fuel injector degradation based on output of injector monitoring circuitry or an engine speed/position sensor (e.g., an increase or decrease of engine speed may be indicative of a change in injector performance). If method 1100 judges that port fuel injector degradation is present, the answer is yes and method 1100 proceeds to 1106. Otherwise, the answer is no and method 1100 proceeds to 1104. Method 1100 may determine a particular port injector is degraded based on output of the monitoring circuitry or engine air-fuel ratio at a particular engine crankshaft angle.

At 1104, method 1100 operates all port fuel injectors and direct fuel injectors based on engine and vehicle operating conditions. The port and direct fuel injectors may inject different amounts of fuel at different times based on engine operating conditions. Method 1100 proceeds to exit after all port and direct fuel injectors are operated.

At 1106, method 1100 judges whether direct fuel injector degradation is present. In one example, method 1100 may judge that direct fuel injector degradation is present if engine air-fuel ratio is more than a predetermined air-fuel ratio away from a desired engine air-fuel ratio. For example, if only direct fuel injectors are activated at a particular engine speed and desired torque, direct fuel injector degradation may be determined if the engine air-fuel ratio is not equivalent to a desired engine air-fuel ratio. Alternatively, method 1100 may judge whether or not there is direct fuel injector degradation based on output of injector monitoring circuitry. If method 1100 judges that direct fuel injector degradation is present, the answer is yes and method 1100 proceeds to 1108. Otherwise, the answer is no and method 1100 proceeds to 1112.

At 1108, method 1100 deactivates a direct injector supplying fuel to a same cylinder as a port fuel injector that is determined to be degraded. Further, the degraded port fuel injector is deactivated by not sending fuel injection pulse widths to the degraded port fuel injector. The direct fuel injector is deactivated so that the remaining cylinders may operate with both port and direct injectors to produce torque and emissions that are consistent between cylinders as compared to operating the engine with one cylinder using direct injection and the remaining cylinders using port and direct injection. Thus, one or more cylinders experiencing port injector degradation are deactivated by not injecting fuel in the cylinder with port fuel injector degradation. Method 1100 proceeds to 1110 after selected cylinders are deactivated.

At 1110, method 1100 increases torque output of at least one of the remaining active cylinders to provide the desired torque. By deactivating one or more engine cylinders at 1108, engine torque may be reduced. Therefore, the decrease in engine torque may be compensated by increasing torque in one or more of the remaining engine cylinders. The torque provided by the remaining cylinders may be increased by opening the engine throttle and increasing fuel supplied to the active cylinder. Further, the maximum engine torque may be limited to a lower value as compared to if injector degradation of reduced performance is not present. Method 1100 proceeds to exit after torque output of one or more active cylinder is increased.

At 1112, method 1100 deactivates all port fuel injectors and supplies fuel to all engine cylinders via only direct fuel injectors. All port fuel injectors are deactivated so that each cylinder produces torque and emissions similar to other engine cylinders. In this way, all engine cylinders may operate similarly instead of one group of cylinders providing different output as compared to other engine cylinders. Method 1100 proceeds to 1114 after all port fuel injector are deactivated.

At 1114, method 1100 adjusts fuel injector timing of direct fuel injectors. The direct fuel injector timing is adjusted to increase an amount of fuel supplied by the direct fuel injectors so that the engine provides a same amount of torque at a particular engine speed and desired torque as when the engine is operated with both port and direct fuel injection. Further, the direct fuel injector timing may be adjusted to reduce particulate formation within the engine. Method 1100 proceeds to exit after direct fuel injector timing is adjusted.

In this way, fuel injector operation may be adjusted during conditions of port fuel injector degradation to improve engine emissions and torque production. By deactivating all engine port fuel injectors when a single or sole port fuel injector is degraded, the engine may be operated to provide more consistent torque and emissions via the active engine cylinders.

Referring now to FIG. 12, an example operating sequence according to the method of FIG. 11 is shown. The operating sequence of FIG. 12 may be provided by the system of FIGS. 1A and 1B including the method of FIG. 11 as executable instructions.

The first plot from the top of FIG. 12 is a plot of cylinder number one port fuel injector state versus time. The vertical axis represents cylinder number one port fuel injector state. Cylinder number one port fuel injector is operating within nominal specifications when the trace is at a higher level near the vertical axis arrow. Cylinder number one port fuel injector is operating at degraded conditions when the trace is a near the horizontal axis. Port injector degradation may be caused by port fuel injector electrical degradation or mechanical degradation. Further, port fuel injector degradation may be caused by a lack of fuel being supplied to the port fuel injector. The horizontal axis represents time and time increases from the right side of the plot to the left side of the plot.

The second plot from the top of FIG. 12 is a plot of cylinder number one direct fuel injector state versus time. The vertical axis represents cylinder number one direct fuel injector state. Cylinder number one direct fuel injector is operating within nominal specifications when the trace is at a higher level near the vertical axis arrow. Cylinder number one direct fuel injector is operating at degraded conditions when the trace is a near the horizontal axis. Direct injector degradation may be caused by direct fuel injector electrical degradation or mechanical degradation. Further, direct fuel injector degradation may be caused by a lack of fuel being supplied to the direct fuel injector. The horizontal axis represents time and time increases from the right side of the plot to the left side of the plot.

The third plot from the top of FIG. 12 is a plot of engine port fuel injector (PFI) state versus time. The vertical axis represents engine port fuel injector state. Engine port fuel injectors may be active when the trace is at a higher level near the vertical axis arrow. Engine port fuel injectors are not active when the trace is a near the horizontal axis. The engine port fuel injector state is an overall indication of the engine's port injectors being active or inactive; however, particular port fuel injectors may be deactivated even when the engine port fuel injector state indicates active. All engine port fuel injectors are deactivated when the engine port fuel injector state indicates deactivated. The horizontal axis represents time and time increases from the right side of the plot to the left side of the plot.

The fourth plot from the top FIG. 12 is a plot of engine direct fuel injector state versus time. The vertical axis represents engine direct fuel injector state. Engine direct fuel injectors may be active when the trace is at a higher level near the vertical axis arrow. Engine direct fuel injectors are not active when the trace is a near the horizontal axis. The engine direct fuel injector state is an overall indication of the engine's direct injectors being active or inactive; however, particular direct fuel injectors may be deactivated even when the engine direct fuel injector state indicates active. All engine direct fuel injectors are deactivated when the engine direct fuel injector state indicates deactivated. The horizontal axis represents time and time increases from the right side of the plot to the left side of the plot.

At time T15, the engine port and direct fuel injectors are indicated as being active. Further, the port and direct fuel injectors for cylinder number one are active. Fuel may be injected via port and direct fuel injectors when the fuel injectors are active.

At time T16, the port fuel injector of cylinder number one is indicated as degraded as indicated by the PFI injector state for cylinder number one transitioning to a lower level. The PFI injector may be degraded if more or less fuel than is desired is or is not injected by the PFI injector. All engine port fuel injectors are deactivated shortly thereafter in response to the port fuel injector of cylinder number one being degraded. No direct fuel injectors are deactivated as indicated by the direct fuel injector state trace being at a higher level and the cylinder number one direct injector state being at a higher level. By deactivating all engine port fuel injectors, it may be possible to have cylinders that operate similarly and provide similar amount of torque and emissions. If all port fuel injectors were not deactivated, some engine cylinders may output different torque and emissions as compared to other engine cylinders operating with similar operating conditions.

At time T17, the cylinder number one direct fuel injector state transitions to a lower level to indicate degradation of cylinder number one's direct fuel injector. Therefore, port fuel injectors that are not degraded are reactivated and both the direct and port fuel injectors of cylinder number one are deactivated shortly thereafter. The direct fuel injectors of engine cylinders other than cylinder number one remain active. Consequently, port and direct fuel injectors of cylinder number one are deactivated while port and direct fuel injectors of other cylinders remain activated. In this way, port fuel injectors may be operated to provide more consistent engine torque and emissions between different engine cylinders.

Referring now to FIG. 13, an example method for compensating direct fuel injector degradation is shown. The method of FIG. 13 may provide the operating sequence shown in FIG. 14. Additionally, at least portions of the method of FIG. 13 may be included as executable instructions in the system of FIGS. 1A and 1B. Further, portions of the method of FIG. 13 may be actions taken by controller 12 in the physical world to transform vehicle operating conditions.

At 1302, method 1300 judges whether or not the direct fuel injector degradation or reduced performance is present. Further, if direct injector degradation is determined, method 1300 may determine the particular direct fuel injector that is degraded. In one example, method 1300 may judge that direct fuel injector degradation is present if engine air-fuel ratio is more than a predetermined air-fuel ratio away from a desired engine air-fuel ratio. Alternatively, method 1300 may judge whether or not there is direct fuel injector degradation based on output of injector monitoring circuitry. If method 1300 judges that direct fuel injector degradation is present, the answer is yes and method 1300 proceeds to 1306. Otherwise, the answer is no and method 1300 proceeds to 1304. Method 1300 may determine a particular direct injector is degraded based on output of the monitoring circuitry or engine air-fuel ratio at a particular engine crankshaft angle.

At 1304, method 1300 operates all port fuel injectors and direct fuel injectors based on engine and vehicle operating conditions. The port and direct fuel injectors may inject different amounts of fuel at different times based on engine operating conditions. Method 1300 proceeds to exit after all port and direct fuel injectors are operated.

At 1306, method 1300 deactivates a port fuel injector that supplies fuel to a same engine cylinder that is supplied fuel by the degraded direct fuel injector. The port fuel injector is deactivated by not sending fuel injector pulse widths to the port fuel injector. Further, the degraded direct fuel injector is deactivated by not sending fuel injector pulse widths to the degraded direct fuel injector. Method 1300 proceeds to 1308 after the degraded direct fuel injector and its associated port fuel injector (e.g., port fuel injector that supplies fuel to a same cylinder as the direct fuel injector) are deactivated.

At 1308, method 1300 judges if the direct fuel injector degradation affects a paired direct injector. A paired direct injector is a direct injector that supplies fuel to a different cylinder than the cylinder that is supplied fuel by the degraded direct fuel injector via a single fuel injector driver. The single fuel injector driver may individually supply current two different fuel injectors. Thus, the fuel injector supplies a pair of fuel injectors. If method 1300 judges that the direct fuel injector degradation affects a paired direct injector (e.g., a direct injector that shares a fuel injector driver with the degraded direct fuel injector), the answer is yes and method 1300 proceeds to 1310. Otherwise, the answer is no and method 1300 proceeds to 1312.

At 1310, method 1300 deactivates the direct fuel injector that is paired with the degraded direct injector at a fuel injector driver. Further, the port fuel injector supplying fuel to the cylinder the paired direct fuel injector supplies fuel to is deactivated. Thus, two cylinders are deactivated. Additionally, torque provided by the remaining cylinders may be increased by opening the engine throttle and increasing fuel supplied to the remaining active cylinders. Further, maximum engine torque may be limited to less than a maximum engine torque if fuel injector degradation is not present. The maximum engine torque may be limited via limiting throttle opening. Method 1300 proceeds to exit after the paired direct fuel injector is deactivate and torque output of active cylinders is increased.

At 1312, method 1300 operates the port and direct fuel injectors in cylinders remaining active in response to vehicle and engine operating conditions. Further, torque output of at least one cylinder is increased to compensate for torque lost by deactivating the cylinder exhibiting direct fuel injector degradation. Torque of an engine cylinder may be increased via increasing air and fuel flow to the cylinder. Method 1300 proceeds to exit after the remaining cylinder port and direct fuel injectors are operated based on engine and vehicle operating conditions.

In this way, fuel injector operation may be adjusted during conditions of direct fuel injector degradation to improve engine emissions and torque production. By a port fuel injector that injects fuel to a same cylinder as a degraded direct fuel injector, it may be possible to reduce the possibility of further degradation to the degraded direct fuel injector.

Referring now to FIG. 14, an example operating sequence according to the method of FIG. 13 is shown. The operating sequence of FIG. 14 may be provided by the system of FIGS. 1A and 1B including the method of FIG. 13 as executable instructions.

The first plot from the top of FIG. 14 is a plot of cylinder number one port fuel injector state versus time. The vertical axis represents cylinder number one port fuel injector state. Cylinder number one port fuel injector is operating within nominal specifications when the trace is at a higher level near the vertical axis arrow. Cylinder number one port fuel injector is operating at degraded conditions when the trace is a near the horizontal axis. Port injector degradation may be caused by port fuel injector electrical degradation or mechanical degradation. Further, port fuel injector degradation may be caused by a lack of fuel being supplied to the port fuel injector. The horizontal axis represents time and time increases from the right side of the plot to the left side of the plot.

The second plot from the top of FIG. 14 is a plot of cylinder number one direct fuel injector state versus time. The vertical axis represents cylinder number one direct fuel injector state. Cylinder number one direct fuel injector is operating within nominal specifications when the trace is at a higher level near the vertical axis arrow. Cylinder number one direct fuel injector is operating at degraded conditions when the trace is a near the horizontal axis. Direct injector degradation may be caused by direct fuel injector electrical degradation or mechanical degradation. Further, direct fuel injector degradation may be caused by a lack of fuel being supplied to the direct fuel injector. The horizontal axis represents time and time increases from the right side of the plot to the left side of the plot.

The third plot from the top of FIG. 14 is a plot of engine port fuel injector (PFI) state versus time. The vertical axis represents engine port fuel injector state. Engine port fuel injectors may be active when the trace is at a higher level near the vertical axis arrow. Engine port fuel injectors are not active when the trace is a near the horizontal axis. The engine port fuel injector state is an overall indication of the engine's port injectors being active or inactive; however, particular port fuel injectors may be deactivated even when the engine port fuel injector state indicates active. All engine port fuel injectors are deactivated when the engine port fuel injector state indicates deactivated. The horizontal axis represents time and time increases from the right side of the plot to the left side of the plot.

The fourth plot from the top FIG. 14 is a plot of engine direct fuel injector state versus time. The vertical axis represents engine direct fuel injector state. Engine direct fuel injectors may be active when the trace is at a higher level near the vertical axis arrow. Engine direct fuel injectors are not active when the trace is a near the horizontal axis. The engine direct fuel injector state is an overall indication of the engine's direct injectors being active or inactive; however, particular direct fuel injectors may be deactivated even when the engine direct fuel injector state indicates active. All engine direct fuel injectors are deactivated when the engine direct fuel injector state indicates deactivated. The horizontal axis represents time and time increases from the right side of the plot to the left side of the plot.

At time T20, the engine port and direct fuel injectors are indicated as being active. Further, the port and direct fuel injectors for cylinder number one are active. Fuel may be injected via port and direct fuel injectors when the fuel injectors are active.

At time T21, the direct fuel injector of cylinder number one is indicated as degraded as indicated by the direct injector state for cylinder number one transitioning to a lower level. The direct fuel injector may be degraded if more or less fuel than is desired is or is not injected by the direct fuel injector. Shortly thereafter, a port fuel injector supplying fuel to cylinder number one is deactivated by not sending a fuel pulse width to the port fuel injector. The port fuel injector for cylinder number one is indicated as not being degraded. The port fuel injectors and direct fuel injectors of other engine cylinders remain active. Further, torque output of active cylinders may be increased to compensate for the loss in torque production from cylinder number one.

In this way, engine torque production may be maintained if a cylinder is deactivated due to direct fuel injector degradation. Further, the port fuel injector supplying fuel to a same cylinder as a degraded direct fuel injector is deactivated so that temperatures in the cylinder may not rise to further degrade the direct fuel injector.

As will be appreciated by one of ordinary skill in the art, the methods described in FIGS. 2, 4, 6, 7, 9, 11, and 13 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware.

Thus, the methods described herein provide for an engine fueling method, comprising: port injecting fuel to a cylinder in a cylinder cycle via a first fuel pulse width, the first fuel pulse width adjusted responsive to engine operating conditions after being scheduled for delivery; and directly injecting fuel to the cylinder in the cylinder cycle via a second fuel pulse width, the second fuel pulse width selectively adjusted after being scheduled for delivery. The method includes where the second fuel pulse width is adjusted based on an ending time of the first fuel pulse width. The method includes where the second fuel pulse width is adjusted after the ending time. The method includes where the first fuel pulse width is adjusted during the port injection of fuel.

In some examples, the method further comprises providing a port fuel injection window, the port fuel injection window starting after an intake valve closing of a cylinder cycle preceding the cylinder cycle and ending before an intake valve opening for the cylinder cycle. The method includes where the first fuel pulse width is selectively adjusted in response to a change in estimated cylinder air amount. The method includes where the second fuel pulse width is scheduled after an end of the first fuel pulse width.

The methods described herein also provide for an engine fueling method, comprising: providing a port fuel injection abort angle after an intake valve closing of a cylinder cycle immediately preceding a first cylinder cycle and before an intake valve opening for the first cylinder cycle; ending port fuel injection for the first cylinder cycle at a latest time corresponding to at or before the port fuel injection abort angle; scheduling a direct fuel injection after the port fuel injection abort angle, a pulse width of the direct fuel injection adjusted for the latest time. The method includes where the ending of port fuel injection is adjusted for changes in estimated cylinder air amount during the cylinder cycle.

The method also includes where the ending of port fuel injection is adjusted multiple times. The method includes where at least a portion of the direct fuel injection occurs during the first cylinder cycle. The method further comprises adjusting the port fuel injection abort angle in response to a port fuel injector pulse width greater than a threshold. The method includes where a start of port fuel injection time during the first cylinder cycle is after the intake valve closing. The method further comprises providing a port fuel injection window between a first crankshaft angle and a second crankshaft angle for the first cylinder cycle.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine fueling method, comprising:
determining whether a port fuel injection window is short or long based on a desired pulse width for a port fuel injection of a first cylinder cycle, relative to a threshold pulse width, the short port fuel injection window having a port fuel injection abort angle after an intake valve closing of a cylinder cycle immediately preceding the first cylinder cycle and before an intake valve opening for the first cylinder cycle;

operating with the desired pulse width in the short port fuel injection window; and in response to determining the port fuel injection window is short:

ending the port fuel injection for the first cylinder cycle at an end time corresponding to at or before the port fuel injection abort angle, the end time adjusted during the short port fuel injection window of the first cylinder cycle; and scheduling a direct fuel injection, including determining a pulse width and a timing of the direct fuel injection, after the port fuel injection abort angle, the pulse width of the direct fuel injection adjusted for the adjusted end time.

2. The method of claim 1, where the adjusted end time is adjusted, from a first end time that is based on the desired pulse width, for changes in estimated cylinder air amount during the first cylinder cycle.

3. The method of claim 2, where the adjusted end time is adjusted multiple times during the short port fuel injection window, after determining the port fuel injection window is short and scheduling the port fuel injection of the first cylinder cycle.

4. The method of claim 3, where at least a portion of the direct fuel injection occurs during the first cylinder cycle.

5. The method of claim 1, further comprising:

operating with the desired pulse width for the port fuel injection shorter than the threshold pulse width and determining the port fuel injection window is short responsive to the desired pulse width being shorter than the threshold pulse width; and operating with the desired pulse width for the port fuel injection longer than the threshold pulse width and determining the port fuel injection window is long responsive to the desired pulse width being longer than the threshold pulse width, wherein the long port fuel injection window has a port fuel injection abort angle before an intake valve closing for the first cylinder cycle and after the intake valve opening of the first cylinder cycle, and, in response to determining the port fuel injection window is long:

ending the port fuel injection for the first cylinder cycle at the end time corresponding to at or before the port fuel injection abort angle, the end time based on the desired pulse width and not adjusted during the long port fuel injection window of the first cylinder cycle; and scheduling the direct fuel injection, including determining the pulse width and the timing of the direct fuel injection, before the port fuel injection abort angle, the pulse width of the direct fuel injection based on the desired pulse width of the port fuel injection.

6. The method of claim 1, where a start of port fuel injection time during the first cylinder cycle is after the intake valve closing of the cylinder cycle immediately preceding the first cylinder cycle.

7. The method of claim 1, where the short port fuel injection window is between a first crankshaft angle and a second crankshaft angle for the first cylinder cycle.

* * * * *